US011760385B2

(12) United States Patent
Manivasagam et al.

(10) Patent No.: US 11,760,385 B2
(45) Date of Patent: Sep. 19, 2023

(54) SYSTEMS AND METHODS FOR VEHICLE-TO-VEHICLE COMMUNICATIONS FOR IMPROVED AUTONOMOUS VEHICLE OPERATIONS

(71) Applicant: UATC, LLC, San Francisco, CA (US)

(72) Inventors: Sivabalan Manivasagam, Toronto (CA); Ming Liang, Toronto (CA); Bin Yang, Toronto (CA); Wenyuan Zeng, Toronto (CA); Raquel Urtasun, Toronto (CA); Tsun-hsuan Wang, Toronto (CA)

(73) Assignee: UATC, LLC, Mountain View, CA (US)

( * ) Notice: Subject to any disclaimer, the term of this patent is extended or adjusted under 35 U.S.C. 154(b) by 34 days.

(21) Appl. No.: 17/066,096

(22) Filed: Oct. 8, 2020

(65) Prior Publication Data
US 2021/0152996 A1 May 20, 2021

Related U.S. Application Data

(60) Provisional application No. 63/034,152, filed on Jun. 3, 2020, provisional application No. 62/936,436, filed on Nov. 16, 2019.

(51) Int. Cl.
*B60Q 1/00* (2006.01)
*B60W 60/00* (2020.01)
(Continued)

(52) U.S. Cl.
CPC ......... *B60W 60/0027* (2020.02); *G06N 3/044* (2023.01); *G06N 3/08* (2013.01);
(Continued)

(58) Field of Classification Search
CPC ......... B60W 60/0027; B60W 2556/65; H04W 4/38; H04W 4/46; G06N 3/0445;
(Continued)

(56) References Cited

U.S. PATENT DOCUMENTS 7,873,074 B1 * 1/2011 Boland ............... H04M 15/852
370/468
2010/0313017 A1 * 12/2010 Stahlin ...................... H04L 9/32
713/168
(Continued)

FOREIGN PATENT DOCUMENTS

WO    WO 2020/224910     11/2020

OTHER PUBLICATIONS

International Search Report and Written Opinion for PCT/US2020/060645, dated Apr. 12, 2021, 18 pages.
(Continued)

*Primary Examiner* — Naomi J Small
(74) *Attorney, Agent, or Firm* — Dority & Manning, P.A.

(57) ABSTRACT

Systems and methods for vehicle-to-vehicle communications are provided. An example computer-implemented method includes obtaining, by a computing system onboard a first autonomous vehicle, sensor data associated with an environment of the first autonomous vehicle. The method includes determining, by the computing system, an intermediate environmental representation of at least a portion of the environment of the first autonomous vehicle based at least in part on the sensor data. The method includes generating, by the computing system, a compressed intermediate environmental representation by compressing the intermediate environmental representation of at least the portion of the environment of the first autonomous vehicle. The method includes communicating, by the computing system, the compressed intermediate environmental representation to a second autonomous vehicle.

18 Claims, 10 Drawing Sheets

(51) Int. Cl.

| | |
|---|---|
| H04W 4/46 | (2018.01) |
| G06N 3/08 | (2023.01) |
| G08G 1/00 | (2006.01) |
| G08G 1/01 | (2006.01) |
| H04W 4/38 | (2018.01) |
| G06N 3/044 | (2023.01) |

(52) U.S. Cl.
CPC ......... *G08G 1/0104* (2013.01); *G08G 1/0112* (2013.01); *G08G 1/22* (2013.01); *H04W 4/38* (2018.02); *H04W 4/46* (2018.02); *B60W 2556/65* (2020.02)

(58) Field of Classification Search
CPC ...... G06N 3/08; G08G 1/0104; G08G 1/0112; G08G 1/22
USPC ...................................................... 340/425.5
See application file for complete search history.

(56) References Cited

U.S. PATENT DOCUMENTS

| | | | |
|---|---|---|---|
| 2018/0204138 A1* | 7/2018 | Nugent | G05D 1/0088 |
| 2019/0138007 A1 | 5/2019 | Baghorskhi et al. | |
| 2019/0139403 A1* | 5/2019 | Alam | G08G 1/0112 |
| 2019/0147250 A1 | 5/2019 | Zhang et al. | |
| 2019/0351899 A1* | 11/2019 | Adam | B60W 50/0097 |
| 2020/0017117 A1* | 1/2020 | Milton | B60W 50/02 |
| 2020/0041612 A1* | 2/2020 | Harrison | G01S 13/865 |
| 2021/0020044 A1* | 1/2021 | Adkar | G07C 5/008 |
| 2021/0001844 A1 | 7/2021 | Perincherry et al. | |
| 2023/0054908 A1* | 2/2023 | Stellpflug | A01M 7/0089 |

OTHER PUBLICATIONS

Caillet et al., "Efficient LiDAR Data Compression for Embedded V2I or V2V Data Handling", arXiv:1904v1, Apr. 11, 2019, 6 pages.
Partial International Search Report for PCT/US2020/060645, dated Feb. 19, 2021, 16 pages.
Balle et al., "Variational Image Compression with a Scale Hyperprior", arXiv:1802.01436v2, May 1, 2018, 23 pages.
Casas et al., "IntentNet: Learning to Predict Intention from Raw Sensor Data", Conference on Robot Learning, Oct. 29-31, 2018, Zurich, Switzerland, 10 pages.
Casas et al., "SPAGNN: Spatially-Aware Graph Neural Networks for Relational Behavior Forecasting from Sensor Data", arXiv:1910.08233v1, Oct. 18, 2019, 11 pages.
Chai et al., "MultiPath: Multiple Probabilistic Anchor Trajectory Hypotheses for Behavior Prediction", arXiv: 1910.05449v1, Oct. 12, 2019, 14 pages.
Chen et al., "Cooper: Cooperative Perception for Connected Autonomous Vehicles based on 3D Point Clouds", arXiv:1905.05265v1, May 13, 2019, 11 pages.
Chen et al., "DSRC and Radar Object Matching for Cooperative Driver Assistance Systems", 2015 IEEE Intelligent Vehicles Symposium (IV), Jun. 28-Jul. 1, 2015, Seoul, Korea, pp. 1348-1354.
Chen et al., "Multi-View 3D Object Detection Network for Autonomous Driving", arXiv:1611.07759v3, Jun. 22, 2017, 9 pages.
Choi et al., "High Efficiency Compression for Object Detection", arXiv:1710.11151v2, Feb. 16, 2018, 5 pages.
Cui et al., "Deep Kinematic Models for Physically Realistic Prediction of Vehicle Trajectories", arXiv:1908.00219v1, Aug. 1, 2019, 10 pages.
Draco, "Draco 3D Data Compression", https://github.com/google/draco, retrieved on Oct. 18, 2021, 14 pages.
Duvenaud et al., "Convolutional Networks on Graphs for Learning Molecular Fingerprints". Conference on Neural Information Processing Systems, Dec. 7-12, 2015, Montreal, Canada, 9 pages.
Gilmer et al., "Neural Message Passing for Quantum Chemistry", International Conference on Machine Learning, Aug. 6-11, 2017, Sydney, Australia, 10 pages.
Hamilton et al., "Inductive Representation Learning on Large Graphs", Conference on Neural Information Processing Systems, Dec. 4-9, 2017, Long Beach, CA, 11 pages.
Jain et al., "Discrete Residual Flow for Probabilistic Pedestrian Behavior Prediction", arXiv:1910.08041v1, Oct. 17, 2019, 13 pages.
Kenney, "Dedicated Short-Range Communications (DSRC) Standards in the United States", Proceedings of the IEEE, Jul. 2011, vol. 99, No. 7, pp. 1162-1182.
Kim et al., "Multivehicle Cooperative Driving Using Cooperative Perception: Design and Experimental Validation", IEEE Transactions on Intelligent Transportation Systems, Apr. 2015, vol. 16, No. 2, pp. 663-680.
Kingma et al., "Adam: A Method for Stochastic Optimization", arXiv:1412.6980v9, Jan. 30, 2017, 15 pages.
Li et al., "Gated Graph Sequence Neural Networks", arXiv:1511.05493v2, Nov. 19, 2015, 19 pages.
Li et al., "Situation Recognition with Graph Neural Networks", International Conference on Computer Vision, Oct. 22-29, 2017, Venice Italy, pp. 4173-4182.
Liang et al., "Deep Continuous Fusion for Multi-Sensor 3D Object Detection", European Conference on Computer Vision, Sep. 8-14, 2018, Munich, Germany, 16 pages.
Liang et al., "Multi-Task Multi-Sensor Fusion for 3D Object Detection", Conference on Computer Vision and Pattern Recognition, Jun. 16-20, 2019, Long Beach, CA, pp. 7345-7353.
Luo et al., "Fast and Furious: Real Time End-to-End 3D Detection, Tracking and Motion Forecasting with a Single Convolutional Net", Conference on Computer Vision and Pattern Recognition, Jun. 18-22, 2018, Salt Lake City, UT, pp. 3569-3577.
Maalej et al., "VANETs Meet Autonomous Vehicles: A Multimodal 3D Environment Learning Approach", arXiv:1705.08624v1, May 24, 2017, 7 pages.
Manivasagam et al., "LiDARsim: Realistic LiDAR Simulation by Leveraging the Real World", arXiv:2006.09348v1, Jun. 16, 2020, 11 pages.
Rauch et al., "Car2X-Based Perception in a High-Level Fusion Architecture for Cooperative Perception Systems", 2012 Intelligent Vehicles Symposium Jun. 3-7, 2012, Alcalá de Henares, Spain, pp. 270-275.
Rawashdeh et al., "Collaborative Automated Driving: A Machine Learning-based Method to Enhance the Accuracy of Shared Information", 2018 21st International Conference on Intelligent Transportation Systems (ITSC), Nov. 4-7, 2018, Maui, Hawaii, pp. 3961-3966.
Rhinehart et al., "PRECOG: PREdiction Conditioned on Goals in Visual Multi-Agent Settings", arXiv:1905.01296v3, Sep. 30, 2019, 24 pages.
Rhinehart et al., "R2P2: A ReparameteRized Pushforward Policy for Diverse, Precise Generative Path Forecasting", European Conference on Computer Vision, Sep. 8-14, 2018, Munich, Germany, 17 pages.
Rockl et al., "V2V Communications in Automotive Multi-sensor Multi-target Tracking", IEEE 68th Vehicular Technology Conference: VTC2008-Fall, Sep. 21-24, 2008, Calgary, Alberta, 5 pages.
Su et al., "Multi-view Convolutional Neural Networks for 3D Shape Recognition", International Conference on Computer Vision, Dec. 11-18, 2015, Las Condes, Chile, pp. 945-953.
Szegedy et al., "Going Deeper with Convolutions", Conference on Computer Vision and Pattern Recognition, Jun. 7-12, 2015, Boston, MA, 9 pages.
Wei et al., "Learning to Localize Through Compressed Binary Maps", Conference on Computer Vision and Pattern Recognition, Jun. 16-20, 2019, Lonb Beach, CA, pp. 10316-10324.
Xiao et al., "Multimedia Fusion at Semantic Level in Vehicle Cooperactive Perception", IEEE International Conference on Multimedia & Expo Workshops (ICMEW), Jul. 23-27, 2018, San Diego, CA, 6 pages.
Yu et al., "Spatio-Temporal Graph Convolutional Networks: A Deep Learning Framework for Traffic Forecasting", arXiv:1709.04875v4, Jul. 12, 2018, 7 pages.
Yuan et al., "Object Matching for Inter-Vehicle CommunicationSystems—An IMM-Based Track Association Approach

(56) References Cited

OTHER PUBLICATIONS

With Sequential Multiple Hypothesis Test", IEEE Transactions on Intelligent Transportation Systems, Dec. 2017, vol. 18, No. 18, pp. 3501-3512.
U.S. Appl. No. 17/066,104, filed Oct. 8, 2020, 84 pages.
U.S. Appl. No. 17/066,108, filed Oct. 8, 2020, 83 pages.
Lin, et al. "A Compressive Sensitive Approach for Connected Vehicle Data Capture and Recovery and its Impact on Travel Time Estimation." arXiv:1806.10046v2. doi.org/10.48550/arXiv.1806.10046. Jun. 26, 2018. 10 pages.
Pang, et al. "Research of Applications of Compressed Sensing in VANET." 2019 International of Electrical and Electronics Engineers (IEEE) 11th International Conference on Communication Software and Networks. Published Jun. 1, 2019. 6 pages.
Wang, et al. "Learn to Compress CSI and Allocate Resources in Vehicular Networks." arXiv:1908.04685v1. doi:10.1109/TCOMM.2020.2979124. Aug. 12, 2019. 28 pages.

\* cited by examiner

SYSTEMS AND METHODS FOR VEHICLE-TO-VEHICLE COMMUNICATIONS FOR IMPROVED AUTONOMOUS VEHICLE OPERATIONS

PRIORITY CLAIM

The present application claims filing benefit of U.S. Provisional Patent Application Ser. No. 62/936,436 having a filing date of Nov. 16, 2019 and U.S. Provisional Patent Application Ser. No. 63/034,152 having a filing date of Jun. 3, 2020, which are incorporated herein by reference in their entirety.

FIELD

The present disclosure relates generally to performing autonomous vehicle operations. In particular, the present disclosure relates to performing autonomous vehicle operations by utilizing machine-learned models for vehicle-to-vehicle communications.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for vehicle-to-vehicle communications. The method includes obtaining, by a computing system including one or more computing devices onboard a first autonomous vehicle, sensor data associated with an environment of the first autonomous vehicle. The method includes determining, by the computing system, an intermediate environmental representation of at least a portion of the environment of the first autonomous vehicle based at least in part on the sensor data. The method includes generating, by the computing system, a compressed intermediate environmental representation by compressing the intermediate environmental representation of at least the portion of the environment of the first autonomous vehicle. The method includes communicating, by the computing system, the compressed intermediate environmental representation to a second autonomous vehicle.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining sensor data associated with an environment of a first autonomous vehicle. The operations include determining an intermediate environmental representation of at least a portion of the environment of the first autonomous vehicle based at least in part on the sensor data and a machine-learned model. The operations include generating a compressed intermediate environmental representation by compressing the intermediated environmental representation of at least the portion of the environment of the first autonomous vehicle. The operations include communicating the compressed intermediate environmental representation to a second autonomous vehicle.

Another example aspect of the present disclosure is directed to an autonomous vehicle. The autonomous vehicle includes one or more sensors, one or more processors, and one or more tangible, non-transitory, computer readable media that collectively store instructions that when executed by the one or more processors cause the one or more processors to perform operations. The operations include obtaining, via the one or more sensors, sensor data associated with an environment of the autonomous vehicle. The operations include determining a first intermediate environmental representation of at least a portion of the environment of the autonomous vehicle based at least in part on the sensor data. The operations include generating a first compressed intermediate environmental representation by compressing the first intermediate environmental representation of at least the portion of the environment of the autonomous vehicle. The operations include determining a recipient to which to communicate the first compressed intermediate environmental representation from among a plurality of potential recipients. The operations include communicating the first compressed intermediate environmental representation to the recipient.

Another example aspect of the present disclosure is directed to a computer-implemented method for vehicle-to-vehicle communications. The method includes obtaining from a first autonomous vehicle, by a computing system including one or more computing devices onboard a second autonomous vehicle, a first compressed intermediate environmental representation. The first compressed intermediate environmental representation is indicative of at least a portion of an environment of the second autonomous vehicle. The method includes generating, by the computing system, a first decompressed intermediate environmental representation by decompressing the first compressed intermediate environmental representation. The method includes determining, by the computing system using one or more machine-learned models, an updated intermediate environmental representation based at least in part on the first decompressed intermediate environmental representation and a second intermediate environmental representation generated by the second autonomous vehicle. The method includes generating, by the computing system, an autonomy output for the second autonomous vehicle based at least in part on the updated intermediate environmental representation.

Another example aspect of the present disclosure is directed to a computing system. The computing system includes a machine-learned aggregation model configured to aggregate a plurality of intermediate environmental representations from a plurality of autonomous vehicles and a machine-learned perception and prediction model configured to generate autonomy outputs. The computing system includes one or more processors and one or more tangible, non-transitory, computer readable media that collectively store instructions that when executed by the one or more processors cause the computing system to perform operations. The operations include obtaining a first compressed intermediate environmental representation from a first autonomous vehicle. The first compressed intermediate environmental representation is indicative of at least a portion of an environment of a second autonomous vehicle. The operations include generating a first decompressed intermediate environmental representation by decompressing the first compressed intermediate environmental representation. The operations include obtaining a second intermediate environmental representation generated by the second autonomous vehicle. The operations include determining, using the machine-learned aggregation model, an updated intermediate environmental representation based at least in part on the first decompressed intermediate environmental representation and the second intermediate environmental representation. The operations include generating, using the machine-learned perception and prediction model, an autonomy output for the second autonomous vehicle based at least in part on the updated intermediate environmental representation.

Another example aspect of the present disclosure is directed to an autonomous vehicle. The autonomous vehicle includes one or more processors and one or more tangible, non-transitory, computer readable media that collectively store instructions that when executed by the one or more processors cause the one or more processors to perform operations. The operations include obtaining a first compressed intermediate environmental representation from another autonomous vehicle. The first compressed intermediate environmental representation is indicative of at least a portion of an environment of the autonomous vehicle. The operations include generating a first decompressed intermediate environmental representation by decompressing the first compressed intermediate environmental representation. The operations include obtaining a second intermediate environmental representation. The operations include determining, using one or more machine-learned models, an updated intermediate environmental representation based at least in part on the first decompressed intermediate environmental representation and the second intermediate environmental representation. The operations include generating an autonomy output for the second autonomous vehicle based at least in part on the updated intermediate environmental representation. The autonomy output is indicative of an object within the environment of the autonomous vehicle and one or more predicted future locations of the object. The operations include generating a motion plan for the autonomous vehicle based at least in part on the autonomy output.

Another example aspect of the present disclosure is directed to a computer-implemented method for vehicle-to-vehicle communications. The method includes obtaining from a first autonomous vehicle, by a computing system including one or more computing devices onboard a second autonomous vehicle, a first compressed intermediate environmental representation. The first compressed intermediate environmental representation is indicative of at least a portion of an environment of the second autonomous vehicle and is based at least in part on sensor data acquired by the first autonomous vehicle at a first time. The method includes generating, by the computing system, a first decompressed intermediate environmental representation by decompressing the first compressed intermediate environmental representation. The method includes determining, by the computing system, a first time-corrected intermediate environmental representation based at least in part on the first decompressed intermediate environmental representation. The first time-corrected intermediate environmental representation corresponds to a second time associated with the second autonomous vehicle.

Another example aspect of the present disclosure is directed to a computing system. The computing system includes a machine-learned time correction model configured to compensate for time differences between a plurality of times. The computing system includes one or more processors and one or more tangible, non-transitory, computer readable media that collectively store instructions that when executed by the one or more processors cause the computing system to perform operations. The operations include obtaining a first compressed intermediate environmental representation from a first autonomous vehicle. The first compressed intermediate environmental representation is based at least in part on sensor data acquired by the first autonomous vehicle at a first time. The operations include generating a first decompressed intermediate environmental representation by decompressing the first compressed intermediate environmental representation. The operations include determining, using the machine-learned time correction model, a first time-corrected intermediate environmental representation based at least in part on the first decompressed intermediate environmental representation. The first time-corrected intermediate environmental representation is adjusted based at least in part on a time difference between the first time and a second time associated with a second autonomous vehicle. The operations include generating an updated intermediate environmental representation based at least in part on the first time-corrected intermediate environmental representation.

Another example aspect of the present disclosure is directed to an autonomous vehicle. The autonomous vehicle includes one or more processors and one or more tangible, non-transitory, computer readable media that collectively store instructions that when executed by the one or more processors cause the computing system to perform operations. The operations include obtaining a first compressed intermediate environmental representation from another autonomous vehicle. The first compressed intermediate environmental representation is based at least in part on sensor data acquired by the other autonomous vehicle at a first time. The operations include generating a first decompressed intermediate environmental representation by decompressing the first compressed intermediate environmental representation. The operations include determining a first time-corrected intermediate environmental representation based at least in part on the first decompressed intermediate environmental representation and one or more machine-learned models. The first time-corrected intermediate environmental representation is adjusted based at least in part on a time difference between the first time and a second time associated with the autonomous vehicle. The operations include performing one or more autonomy operations of the autonomous vehicle based at least in part on the first time-corrected intermediate environmental representation.

Other example aspects of the present disclosure are directed to systems, methods, vehicles, apparatuses, tangible, non-transitory computer-readable media, and memory devices for operating autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
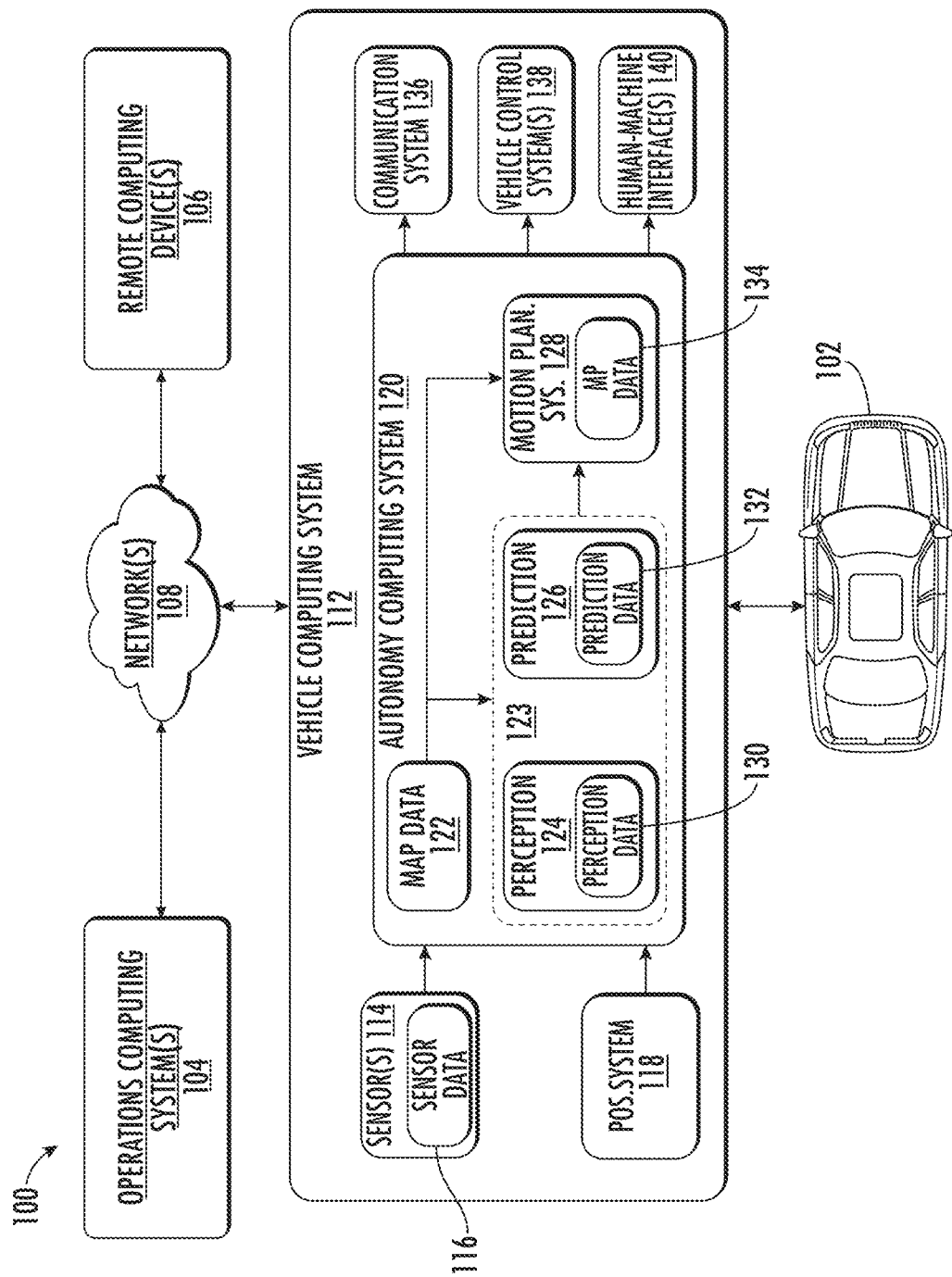
FIG. 1 depicts a block diagram of an example system for an autonomous vehicle according to example embodiments of the present disclosure.

Aspects of the present disclosure are directed to improved systems and methods for vehicle-to-vehicle communications among autonomous vehicles and/or other systems. More particularly, the inter-vehicle communication technology of the present disclosure allows autonomous vehicles and/or other systems to share compressed intermediate environmental feature representations and intelligently aggregate this information to improve autonomous vehicle/system operations. For instance, a first autonomous vehicle can obtain sensor data (e.g., Light Detection and Ranging (LIDAR) data, etc.) indicative of the vehicle's surrounding environment. The first autonomous vehicle can generate an intermediate environmental representation based on the sensor data. The intermediate environmental representation can include, for example, a feature map generated from the sensor data (e.g., voxelized LIDAR data). The intermediate environmental representation can be compressed by the first autonomous vehicle and communicated to a second autonomous vehicle. By compressing and transmitting the intermediate environmental representation (e.g., rather than raw sensor data), the autonomous vehicles can save bandwidth requirements while maintaining important information encoded in the intermediate environmental representation.

The second autonomous vehicle can utilize the intermediate environmental representation generated by the first autonomous vehicle to improve its autonomous operations. For instance, the second autonomous vehicle (the recipient vehicle) can obtain the compressed intermediate environmental representation (from the first/transmitter vehicle) and decompress it. The second autonomous vehicle can adjust the intermediate environmental representation so that it compensates for a time delay from when the original sensor data was acquired by the first autonomous vehicle. The second autonomous vehicle can utilize a machine-learned aggregation model to generate an updated intermediate environmental representation based at least in part on the time-corrected intermediate environmental representation. As further described herein, the machine-learned aggregation model (e.g., a graph neural network) can aggregate the time-corrected intermediate environmental representation with one or more intermediate environmental representations generated by the second autonomous vehicle to create the updated intermediate environmental representation. This type of aggregation can significantly improve the performance of downstream autonomous operations by increasing the range considered by the second autonomous vehicle.

The second autonomous vehicle can perform autonomy operation(s) based on the updated intermediate environmental representation. By way of example, the second autonomous vehicle can input the updated intermediate environmental representation into a joint machine-learned perception and prediction model that is configured to identify objects proximate to the autonomous vehicle and predict the future location(s) of those objects. By utilizing the updated intermediate environmental representation, these object detections/predictions can account for the field of view/perceptive of the second autonomous vehicle and also the field of view/perspective of the first autonomous vehicle. This can lead to more accurate estimates of the object's position, size, and shape, as well as the predicted future trajectory of the object and improve the ability of the autonomous vehicle to safely plan its motion though its environment. Moreover, the technology described herein can increase autonomous vehicle confidence, which can help reduce the amount of processing and memory resources needed for an autonomous vehicle to arrive at a decision as it operates in real-time (e.g., due to less iterations/alternatives considered).

The following describes the technology of this disclosure within the context of autonomous vehicles for example purposes only. As described herein, the technology is not limited to an autonomous vehicle setting and can be implemented within other robotic and/or computing systems, such as those utilizing object detection and prediction machine-learned models. Moreover, the technology of this disclosure is described within the context of vehicle-to-vehicle communications for example purposes only. The technology can be utilized by a variety of types of computing systems that may communicate with other computing systems of the same or different type. By way of example, a ground-based autonomous vehicle or robotic system can utilize the technology described herein for communicating with another type of vehicle (e.g., aerial vehicle, etc.) and/or an infrastructure element (e.g., a stationary sensor suite on a building, traffic light, etc.).

An autonomous vehicle can include an onboard vehicle computing system with a variety of components for operating with minimal and/or no interaction from a human operator. For example, the computing system can be located onboard the autonomous vehicle and include one or more sensors (e.g., cameras, LIDAR, Radio Detection and Ranging (RADAR), etc.), an autonomy computing system (e.g., for determining autonomous navigation), one or more vehicle control systems (e.g., for controlling braking, steering, powertrain), etc.

The vehicle computing system (e.g., the autonomy computing system) can include sub-systems that cooperate to perceive the surrounding environment of the autonomous vehicle and determine a motion plan for controlling the motion of the autonomous vehicle. For example, the vehicle computing system can include a joint perception and prediction system configured to perceive object(s) within the surrounding environment of the autonomous vehicle and to predict motion of the object(s) within the surrounding environment of the autonomous vehicle. In some implementations, the vehicle computing system can separate these perception and prediction functions into separate systems. The vehicle computing system can include a motion planning system configured to plan the motion of the autonomous vehicle with respect to the object(s) within the surrounding environment of the autonomous vehicle.

Autonomous vehicles can operate within geographic areas or have operating domains that can include other autonomous vehicles. For example, a plurality of autonomous vehicles can be located within a geographic area. The geographic area can include one or more travel ways (e.g., roadways, etc.) and one or more geographic features (e.g., cross walks, lane boundaries, etc.). In some implementations, the geographic area can include infrastructure elements that include computing systems with communication technology capable of communicating with one or more of the autonomous vehicles within the geographic area, as further described herein. The geographic area can also include one or more objects. The objects can include, for example, static object(s) (e.g., lampposts, parking meters, etc.) and/or dynamic actor objects (e.g., pedestrians, vehicles, bicycles/bicyclists, etc.) that are and/or may be in motion.

Each of the plurality of autonomous vehicles can include a communication system that allows the respective vehicle's computing system to communicate with system(s) that are remote from the autonomous vehicle. For example, an autonomous vehicle can utilize its communication system to send and receive messages (e.g., via an internet connection) from a cloud-based server system that helps support the autonomous vehicle. This can include, for example, an offboard service assignment system and routing system that matches the autonomous vehicle to a request for a vehicle service (e.g., rideshare service) and provides the autonomous vehicle with a route for completing the vehicle service. Each autonomous vehicle can also have a communication range that allows the autonomous vehicle to communicate with computing systems nearby the autonomous vehicle. For example, a first autonomous vehicle can have a first communication range that is based at least in part on the vehicle's communication hardware (e.g., antenna, etc.) and the communication protocol utilized by the first autonomous vehicle. The first communication range can be represented by a radial distance from the first autonomous vehicle. The first autonomous vehicle can communicate to an ecosystem of autonomous vehicles within the first communication range. For example, the first autonomous vehicle (a "transmitter autonomous vehicle") can communicate data to a second, different autonomous vehicle ("a recipient autonomous vehicle") that is within the first communication range of the first autonomous vehicle. The systems and methods of the present disclosure can allow the ecosystem of autonomous vehicles to provide inter-vehicle communications that improve the vehicles' autonomous operations while reducing the communication bandwidth and potential information loss associated with doing so.

A first/transmitter autonomous vehicle (e.g., its onboard vehicle computing system) can obtain sensor data associated with an environment of the transmitter autonomous vehicle. The sensor data can include one or more types of sensor data associated with one or more sensor modalities. For example, the sensor data can include three-dimensional point cloud data (e.g., LIDAR point cloud data). In some implementations, the sensor data can include a fusion of different types of sensor data. For example, the sensor data can include a first type of sensor data (e.g., camera image data) associated with a first sensor modality (e.g., stereo camera) and a second type of sensor data (e.g., LIDAR data) associated with a second sensor modality (e.g., LIDAR system). In some implementations, the sensor data can include data acquired by multiple different autonomous vehicles. For example, the sensor data can include a first set of sensor data (e.g., a first set of LIDAR data) acquired by the transmitter autonomous vehicle and a second set of sensor data (e.g., a second set of LIDAR data) that was acquired by another autonomous vehicle in its ecosystem and sent to the transmitter autonomous vehicle.

The transmitter autonomous vehicle can determine a first intermediate environmental representation of at least a portion of the environment of the transmitter autonomous vehicle based at least in part on the sensor data. The first intermediate environmental representation can include a feature map indicative of at least a portion of the environment of the transmitter autonomous vehicle. This portion of the environment can be, for example, a portion of the transmitter autonomous vehicle's environment that can be captured within the sensor's field of view (or a portion thereof) and represented in the sensor data. To determine the intermediate environmental representation, the transmitter autonomous vehicle can generate voxelized sensor data by voxelizing the three-dimensional point cloud data of the sensor data. By way of example, the transmitter autonomous vehicle can extract raw features from its LIDAR sensor data and transform them into a bird's eye view (BEV). The features can include, for example, a heading and/or shape of an object indicated in the first intermediate environmental representation. The transmitter autonomous vehicle can voxelize the LIDAR point clouds (e.g., in 15 cm$^3$, etc.), apply several convolutional layers, and output feature maps of shape H×W×C, where H×W denotes the scene range in BEV, and C is the number of feature channels. The transmitter autonomous vehicle can input the voxelized sensor data into a machine-learned model (e.g., a convolutional neural network, etc.) configured to apply one or more convolutional layers to the voxelized sensor data. For example, the machine-learned model can utilize a plurality of layers (e.g., three layers, etc.) of 3×3 convolution filters (e.g., with strides of 2, 1, 2 respectively) to produce the first intermediate environmental representation. The first intermediate environmental representation can be, for example, a 4× downsampled spatial feature map. The feature map can be represented as a matrix generated from the array(s) of the sensor data. The transmitter vehicle can receive the first intermediate environmental representation as an output of the machine-learned model.

The transmitter autonomous vehicle (e.g., its onboard vehicle computing system) can generate a first compressed intermediate environmental representation by compressing the first intermediate environmental representation. For instance, the vehicle computing system of the transmitter autonomous vehicle can include a machine-learned compressor model. The compressor model can include an encoder, a quantizer, and entropy coding/compression. A variational image compression algorithm can be used, where a convolutional neural network learns to compress an input (e.g., the first intermediate environmental representation) with the help of a learned hyperprior. The latent representation can then be quantized and further encoded losslessly with very few bits. In this way, the feature map of the first intermediate environmental representation (e.g., a rectangular tensor) can be compressed into a bitstream.

The transmitter autonomous vehicle can select a recipient autonomous vehicle to which to communicate the first compressed intermediate environmental representation from among a plurality of autonomous vehicles. In some implementations, the transmitter autonomous vehicle can select a recipient autonomous vehicle based at least in part on a communication range of the transmitter autonomous vehicle. For example, the transmitter autonomous vehicle can determine that it will communicate the first compressed intermediate environmental representations to one or more of the autonomous vehicles within its communication range. In some implementations, the transmitter autonomous vehicle can select a recipient autonomous vehicle based at least in part on data indicating that the recipient autonomous vehicle is capable of processing the compressed intermediate environmental representations (e.g., by at least decompressing them). For example, there can be a plurality of autonomous vehicles within the communication range of the transmitter autonomous vehicle. In some implementations, only a subset of those autonomous vehicles may be capable of processing the compressed intermediate environmental representation. Only some of the autonomous vehicles may have the systems/technology/models needed to decompress compressed intermediate environmental representations, as described herein. The transmitter autonomous vehicle may communicate with the other autonomous vehicles (e.g., when entering the vehicle's communication range, periodically, etc.) to determine which of the autonomous vehicles are able to utilize intermediate environmental representations. This can include, for example, an exchange of identifiers, information, and/or other data indicating that a respective autonomous vehicle is able to transmit, receive, and/or process compressed intermediate environmental representations in the manner described herein.

The transmitter autonomous vehicle (e.g., its onboard computing system) can communicate the first compressed intermediate environmental representation to the selected recipient autonomous vehicle(s). The first compressed intermediate environmental representation can also be associated with a first time. For example, the first time can be a sensor timestamp indicative of when the sensor data (e.g., utilized to generate the first intermediate environmental representation) was acquired by the sensors of the transmitter autonomous vehicle.

The second/recipient autonomous vehicle (e.g., its onboard vehicle computing system) can obtain the first compressed intermediate environmental representation from the transmitter autonomous vehicle. The first compressed intermediate environmental representation can be indicative of at least a portion of an environment of the recipient autonomous vehicle. The recipient autonomous vehicle can also obtain compressed intermediate environmental representations from one or more other autonomous vehicles.

The recipient autonomous vehicle (e.g., its onboard vehicle computing system) can generate a first decompressed intermediate environmental representation by decompressing the first compressed intermediate environmental representation. For instance, the recipient autonomous vehicle can include a decompressor model that includes a decoder and entropy decoding techniques. The first decompressed intermediate environmental representation can be generated via the application of the decompressor model.

The recipient autonomous vehicle (e.g., its onboard vehicle computing system) can determine, using one or more machine-learned models, an updated intermediate environmental representation based at least in part on the first decompressed intermediate environmental representation (e.g., originally generated by the transmitter autonomous vehicle) and a second intermediate environmental representation generated by the recipient autonomous vehicle. The second intermediate environmental representation can be generated by the recipient autonomous vehicle in a manner similar to that previously described with respect to the transmitter autonomous vehicle. For example, the recipient autonomous vehicle can obtain sensor data via one or more sensors of the recipient autonomous vehicle and determine the second intermediate environmental representation based at least in part on the sensor data obtained via the one or more sensors of the recipient autonomous vehicle (e.g., by extracting features to create a downsampled spatial feature map).

In some implementations, the one or more models used to create the updated intermediate environmental representation can include a machine-learned time correction model (e.g., neural network). The machine-learned time correction model can be configured to adjust a decompressed intermediate environmental representation to account for a time difference between a first time and a second time associated with the recipient autonomous vehicle. As described herein, the first time can be, for example, associated with a sensor timestamp of the first autonomous vehicle. The second time can be, for example, indicative of a time at which the recipient autonomous vehicle intends to perceive the environment, a time at which the recipient autonomous vehicle has acquired its own sensor data to be used for autonomous operations (as described herein), and/or another time. By way of example, the recipient autonomous vehicle (e.g., its onboard vehicle computing system) can determine a time-corrected intermediate environmental representation based at least in part on the first decompressed intermediate environmental representation and the machine-learned time correction model. The time-corrected intermediate environmental representation can account for a time delay associated with the first compressed intermediate environmental representation obtained from the transmitter autonomous vehicle. The recipient autonomous vehicle can input the first decompressed first intermediate environmental representation into the machine-learned time correction model (e.g., neural network) and can obtain a first time-corrected intermediate environmental representation as an output of the machine-learned time correction model. The first time-corrected intermediate environmental representation can correspond to the second time associated with the recipient autonomous vehicle.

The one or more models used to create the updated intermediate environmental representation can include a machine-learned aggregation model. The machine-learned aggregation model can be configured to aggregate a plurality of intermediate environmental representations from a plurality of autonomous vehicles. For instance, the recipient autonomous vehicle can determine an updated intermediate environmental representation based at least in part on the first time-corrected intermediate environmental representation, the second intermediate environmental representation generated by the recipient autonomous vehicle, and the machine-learned aggregation model. By way of example, the recipient autonomous vehicle (e.g., its onboard vehicle computing system) can input the first time-corrected intermediate environmental representation and the second intermediate environmental representation (generated by the recipient autonomous vehicle) into the machine-learned aggregation model. The machine-learned aggregation model can be configured to aggregate the first time-corrected intermediate environmental representation and the second intermediate environmental representation to create an updated intermediate environmental representation. The recipient autonomous vehicle can obtain the updated intermediate environmental representation as an output of the machine-learned aggregation model.

The machine-learned aggregation model can include a graph neural network that includes a plurality of nodes. Each node of the graph neural network can correspond to a respective autonomous vehicle of a plurality of autonomous vehicles within the environment of the recipient autonomous vehicle. This can include, for example, vehicles within the communication range of the recipient autonomous vehicle. Each respective autonomous vehicle can be associated with a respective set of spatial coordinates, which can be represented by its associated node. One of the nodes can correspond to the transmitter autonomous vehicle.

The machine-learned aggregation model can be configured to transform inputted intermediate environmental representation(s) based at least in part on a set of spatial coordinates associated with the transmitter autonomous vehicle. For instance, the machine-learned aggregation model can be configured to initialize a node state of at least one node of the graph neural network and update the node state of the at least one node based at least in part on a spatial transformation. For instance, in the graph neural network, each node can maintain a state representation. At each iteration, messages can be sent between nodes of the graph and the node states for each node can be updated based on the aggregated received information (e.g., of the messages) using a neural network. Graphs for different vehicles can be different, as each vehicle can receive communications from one or more different vehicles (the set of vehicles within one vehicle's communication range may be different than the vehicles within another vehicle's communication range).

As described herein, the recipient autonomous vehicle can compensate for the time delay between the vehicles, which can be used to create an initial state for each node in the graph. For an autonomous vehicle defined as node i, the recipient autonomous vehicle can apply a convolutional neural network that takes as input the decompressed intermediate environmental representation $\hat{z}_i$ and time delay $\Delta t_{i \to k}$ with respect to the recipient autonomous vehicle. The recipient autonomous vehicle can take the representation and concatenate with zeros to augment the capacity of the node state in order to aggregate the information received from other vehicles after propagation. The initial node state $h_i^{(0)}$ can be represented as follows (where || indicates concatenation):

$$h_i^{(0)} = CNN(\hat{z}_i, \Delta t_{i \to k}) || 0$$

The recipient autonomous vehicle can perform message passing to share features between vehicle nodes. At iteration l, for vehicle node i sending a message $m_{i \to k}^{(l)}$ to vehicle node k, the recipient autonomous vehicle can apply a relative spatial transformation $\xi_{i \to k}$ to warp the state at node i to the feature space of node k:

$$m_{i \to k}^{(l)} = T(h_i^{(l)}, \xi_{i \to k}) \cdot M_{i \to k}$$

where T applies the spatial transformation and resampling of the feature state via bilinear-interpolation, and $M_{i \to k}$ masks out out-of-bound regions after warping. This can be helpful because portions of the transmitter autonomous vehicle features may be further away than the recipient autonomous vehicle's current range.

The recipient autonomous vehicle can aggregate the received messages at node i via an aggregation function φ (e.g., sum, mean, pooling) and update the node state with a ConvGRU:

$$h_i^{(l+1)} = ConvGRU(h_i^{(l)}, \varphi([\forall_{j \in N(i)}, m_{j \to i}^{(l)}]))$$

where $j \in N(i)$ are the neighboring nodes in the network for node i and φ is the mean operator. After the final iteration, a multilayer perceptron can output the updated intermediate environmental representation:

$$z_j^{(L)} = MLP(h_j^{(L)})$$

The recipient autonomous vehicle can generate an autonomy output for the recipient autonomous vehicle based at least in part on the updated intermediate environmental representation. The autonomy output can be indicative of a bounding shape associated with an object within the environment of the recipient autonomous vehicle and one or more predicted future locations of the object. In some implementations, to generate the autonomy output, the recipient autonomous vehicle can utilize a machine-learned perception and prediction model. The machine-learned perception and prediction model can be configured to generate the autonomy output(s). The joint perception and prediction model can include several memories and networks. For example, the joint perception and prediction model can include a plurality of network branches (e.g., a branch for perception, a branch for prediction, etc.), a plurality of memories (e.g., an appearance memory, object path memory, etc.) as well as an object path proposal network and a path refinement network.

The recipient autonomous vehicle can input the updated intermediate environmental representation into a machine-learned perception and prediction model and obtain the autonomy output as an output of the machine-learned perception and prediction model. For instance, the recipient autonomous vehicle can apply a set of four convolutional blocks to extract a high-level representation suitable for a perception and prediction task. The block helps to capture multi-scale context efficiently, which can be helpful for the prediction function. A feature map can be used with two network branches that output detection and motion forecasting estimates respectively. The output of the detection branch can be parameterized as (x, y, w, h, θ), which denotes the position, size and orientation of objects. This can be represented as a bounding shape associated with an object within the environment of the recipient autonomous vehicle. The output of the prediction branch can be parameterized as (xt, yt), which denotes the object's location at future time step t. This can indicate one or more future location(s) of the object. The autonomy output can be indicative of the output of the detection branch and the prediction branch (e.g., a bounding shape and predicted future location(s)).

The recipient autonomous vehicle (e.g., its onboard vehicle computing system) can generate a motion plan for the autonomous vehicle based at least in part on the autonomy output. For example, the recipient autonomous vehicle can include a motion planning system. The motion planning system can determine a motion plan and generate motion plan data for the recipient vehicle based at least in part on the autonomy output. The motion plan can be generated based at least in part on the autonomy output in that it can consider an object (and/or its future location(s)) described in the autonomy output when planning the motion of the autonomous vehicle, whether or not that is overridden by other factors (e.g., other objects, unexpected occurrences, etc.) or eventually effects the actual motion of the vehicle. The motion plan data can include vehicle actions, trajectories, waypoints, etc. with respect to the objects proximate to the autonomous vehicle as well as the predicted movements. For example, the motion planning system can include one or more machine-learned models/optimization algorithms that consider cost data associated with a vehicle action as well as other objective functions (e.g., cost functions based on speed limits, traffic lights, and/or other aspects of the environment), if any, to determine optimized variables that make up the motion plan data. By way of example, the motion planning system can determine that the vehicle can perform a certain action (e.g., stop for an object) without increasing the potential risk to the vehicle and/or violating any traffic laws (e.g., speed limits, lane boundaries, signage, etc.). The motion plan data can include a planned trajectory, velocity, acceleration, and/or other actions.

The recipient autonomous vehicle (e.g., its onboard vehicle computing system) can initiate a motion control of the recipient autonomous vehicle based at least in part on the motion plan. A motion control can include an action to implement, change, continue, and/or otherwise effect the motion of the autonomous vehicle. The motion planning system can provide the motion plan data indicative of the vehicle actions, a planned trajectory, and/or other operating parameters to the vehicle control systems to implement the motion plan data for the vehicle. For instance, the vehicle can include a vehicle interface configured to translate the motion plan data into instructions. By way of example, the vehicle interface can translate motion plan data into instructions for controlling the recipient vehicle including adjusting the steering of the vehicle "X" degrees and/or applying a certain magnitude of braking force to avoid interfering with an object indicated in the autonomy output. The vehicle interface can send one or more control signals to the responsible vehicle control component (e.g., braking control system, steering control system, and/or acceleration control system) to execute the instructions and implement the motion plan data. In this way, the recipient vehicle can account for and control its motion with respect to object(s) outside of the normal field of view of the recipient vehicle but within the field of view of the transmitter autonomous vehicle.

The machine-learned model(s) of the described system can be trained in several stages. For instance, a sensor backbone (e.g., LIDAR backbone for helping to create the intermediate environmental representation) and output headers can be pre-trained on a real-LIDAR single-vehicle dataset, bypassing the cross-vehicle aggregation stage. The loss function can be cross-entropy on a vehicle classification output and smooth 11 on the bounding box parameters. Hard-negative mining can be applied as well to improve performance. The sensor backbone (e.g., LIDAR backbone), cross-vehicle aggregation, and output header models can be jointly finetuned on a simulated vehicle-to-vehicle dataset (described below) with synchronized inputs (e.g., no time delay) using the same loss function. The training can avoid the use of a temporal warping function at this stage. During training, for every example in the minibatch, the number of connected vehicles can be randomly sampled uniformly on [0,min(c, 6)], where c is the number of candidate vehicles available. This can help ensure that the architecture of the machine-learned model(s) can handle arbitrary graph connectivity while also making sure the fraction of vehicles in the scene/ecosystem on the network remains reasonable.

With the main network trained, the compression model can be trained. To do so, the main network (backbone, aggregation, output header) can be fixed since this is reconstructing the decompressed feature map. The compression model can be trained with a rate-distortion objective, which aims to maximize the bit rate in transmission while minimizing the distortion between uncompressed and decompressed data. The rate objective can be defined as the entropy of the transmitted code, and the distortion objective as the reconstruction loss (e.g., between the decompressed and uncompressed feature maps). Finally, the temporal warping function can be trained to compensate for time delay with asynchronous inputs, where all other parts of the network are fixed. The time delay can be uniformly sampled between 0.0 s and 0.1 s (e.g., time of one 10 Hz LIDAR sweep).

The simulated vehicle-to-vehicle dataset (used for training) can be created using a sensor simulation system. The sensor simulation system can use a large catalog of 3D static scenes and dynamic objects that are built upon real-world data collections to provide a set of rich and diverse assets from which to simulate new scenarios. The sensor simulation system can apply raycasting and machine learning to generate a realistic sensor point cloud such as, for example, a LIDAR point cloud. The sensor simulation system can allow for the creation of vehicle-to-vehicle scenes where a percentage of the vehicles are autonomous vehicles and generate realistic sensor data (e.g., LIDAR data) at different vehicle locations.

The simulations can be based on snippets (e.g., 25-second snippets, etc.) of labeled data recorded by an autonomous vehicle in the real world, which contains temporal tracks of the bounding boxes of all agents in the scene with respect to the recording vehicle. To generate the simulated vehicle-to-vehicle dataset, a real-world snippet can be recreated in a simulated virtual world using these ground-truth tracks. By using the same scenario layouts and agent trajectories recorded from the real world, the simulation system can replicate realistic traffic and vehicle motion for vehicle-to-vehicle dataset generation. At each timestep, actor 3D-assets can be placed into the virtual scene according to real-world labels and generate the sensor data (e.g., LIDAR point cloud data, etc.) at different candidate vehicle locations. Candidate autonomous vehicles can be non-parked vehicles that are within a communication range (e.g., a 50-meter broadcast range) of a subject vehicle in the scene (e.g., the autonomous vehicle that recorded the snippet in the real-world). This data generation approach allows for the generation of more realistic and diverse topologies of vehicle-to-vehicle communication networks.

It should be understood that each autonomous vehicle within the ecosystem (e.g., within a communication range)

can perform the functions of a transmitter autonomous vehicle and the functions of a recipient autonomous vehicle as described above. As such, an autonomous vehicle can not only communicate compressed intermediate environmental representations to other autonomous vehicles but can also receive compressed intermediate environmental representations from other autonomous vehicles. In some implementations, the autonomous vehicle(s) can also, or alternatively, send and receive autonomy outputs (e.g., of the joint perception/prediction model) and/or sensor data among one another.

The systems and methods described herein provide a number of technical effects and benefits. For instance, by communicating compressed activations of their intermediate network layers (e.g., an intermediate environmental representation) during joint perception and prediction computation, an autonomous vehicle can effectively represent its point of view of the environment to another vehicle. Moreover, by sending and receiving compressed intermediate environmental representation (e.g., feature maps) the autonomous vehicles can share more information in a bandwidth efficient manner as compared to, for example, communicating raw sensor data, which can include unneeded information and utilize a significant amount of bandwidth. This can improve autonomous vehicles' ability to perceive its surroundings, predict future state(s) of those surroundings, and plan its motion accordingly, without sacrificing computational speed. Ultimately, this can lead to safer autonomous vehicle operations.

Example aspects of the present disclosure can provide an improvement to computing technology, such as autonomous vehicle computing technology. For instance, the systems and methods of the present disclosure provide an improved approach to vehicle-to-vehicle communication and autonomous operations. For instance, a transmitter autonomous vehicle can obtain sensor data associated with an environment of a transmitter autonomous vehicle and determine an intermediate environmental representation (e.g., feature map, etc.) of at least a portion of the environment of the transmitter autonomous vehicle based at least in part on the sensor data. An intermediate environmental representation can be helpful in a multi-vehicle setting because, for example, it can be based on various types of sensor data and sensor modalities. The transmitter autonomous vehicle can compress the intermediate environmental representations and communicate the representations to another autonomous vehicle (a recipient autonomous vehicle). This allows for an effective and efficient sharing of vehicle information because the intermediate environmental representations can be compressed without losing too much information. Moreover, the compressed intermediate environmental representations can reduce bandwidth requirements without sacrificing performance.

The recipient autonomous vehicle can obtain the compressed intermediate environmental representations, decompress it, and apply a time-correction technique. This can allow the recipient autonomous vehicle to utilize intermediate environmental representations from multiple vehicles and at asynchronous times. The recipient autonomous vehicle can utilize one or more machine-learned model(s) to aggregate intermediate environmental representation(s) (e.g., generated from other vehicles) with intermediate environmental representation(s) generated by the recipient autonomous vehicle. For this aggregation, the recipient autonomous vehicle can utilize a graph neural network that provides an accurate modeling of the autonomous vehicle ecosystem that is exchanging information. This can allow the recipient autonomous vehicle to more effectively account for the spatial coordinates (and times) associated with each autonomous vehicle exchanging intermediate environmental representations. The aggregated/updated intermediate environmental representation can be fed to a joint perception/prediction model for generation of an autonomy output. The autonomy output can indicate, for example, the detection and predicted future motion of object(s) within the surrounding environment of the recipient autonomous including, for example, occluded objects. In this way, the systems and methods of the present disclosure can significantly boost the performance of the joint perception/prediction model by taking into account the intermediate environmental representations from other vehicles. Moreover, the systems and methods allow autonomous vehicles (and/or other computing systems) to leverage cheap, low bandwidth, and decentralized communication devices for passing the intermediate environmental representations. Accordingly, the described technology can improve an autonomous vehicle's confidence level in its perception/prediction/motion planning functions, which can save significant onboard computing resources (e.g., processors, memory, etc.) that may otherwise be used for additional iterations, costing analysis, and/or possible remote assistance.

Various means can be configured to perform the methods and processes described herein. For example, a computing system can include sensor data acquisition unit(s), intermediate environmental representation generation unit(s), compressor unit(s), decompressor unit(s), time-delay correction unit(s), aggregation unit(s), perception/prediction unit(s), motion planning unit(s), control unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., sensor data acquisition unit(s), etc.) can be configured to obtain sensor data associated with an environment of an autonomous vehicle. The means (e.g., intermediate environmental representation unit(s), etc.) can be configured to determine an intermediate environmental representation of at least a portion of the environment of the transmitter autonomous vehicle based at least in part on the sensor data. The means (e.g., compressor unit(s), etc.) can be configured to generate a compressed intermediate environmental representation by compressing the intermediate environmental representation of at least the portion of the environment of the transmitter autonomous vehicle. The means (e.g., communication unit(s), etc.) can be configured to communicate and/or obtain compressed intermediate environmental representation(s) and/or other information to/from another autonomous vehicle and/or another system. The means (e.g., decompressor unit(s), etc.) can be configured to generate a decompressed intermediate environmental representation by decompressing the compressed intermediate environmental representation. The means (e.g., time-delay correction unit(s), etc.) can be configured to generating a time-corrected first intermediate environmental representation. To do so, the means can, for example, input the decompressed first intermediate environmental representation into a machine-learned time correction model and obtain a time-corrected intermediate environmental representation as an output of the machine-learned time correction model. The means (e.g., aggregation unit(s), etc.) can be configured to determine an updated intermediate environmental representation based at least in part on a decompressed intermediate environmental representation and another intermediate environmental representation (e.g., generated by a recipient autonomous vehicle). The means (e.g., perception/prediction unit(s), etc.) can be configured to generate an autonomy output for the recipient autonomous vehicle based at least in part on the updated intermediate environmental representation. The means (e.g., motion planning unit(s), etc.) can be configured to generate a motion plan for the recipient autonomous vehicle based at least in part on the autonomy output. The means (e.g., control unit(s), etc.) can be configured to initiate a motion control of the recipient autonomous vehicle based at least in part on the motion plan.

With reference to the figures, example embodiments of the present disclosure will be discussed in further detail.

FIG. 1 depicts a block diagram of an example system 100 for an autonomous vehicle according to example embodiments of the present disclosure. As illustrated, FIG. 1 shows a system 100 that can include a vehicle 102; an operations computing system 104; one or more remote computing devices 106; communication network(s) 108; a vehicle computing system 112; one or more sensors 114; sensor data 116; a positioning system 118; an autonomy computing system 120; map data 122; a perception system 124; a prediction system 126; a motion planning system 128; perception data 130; prediction data 132; motion plan data 134; a communication system 136; a vehicle control system 138; and a human-machine interface 140. The vehicle 102 can be an autonomous vehicle.

The operations computing system 104 can be associated with a service entity that can provide one or more vehicle services to a plurality of users via a fleet of vehicles that includes, for example, the vehicle 102. The vehicle services can include transportation services (e.g., human transport ridesharing, ride-hailing services), courier services (e.g., item transport from a requested origin to destination), delivery services (e.g., item transport to a requested destination), and/or other types of services. The operations computing system 104 can be remote from the vehicle 102.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices.

The one or more memory devices of the operations computing system 104 can store instructions that when executed by the one or more processors cause the one or more processors to perform operations and functions associated with the service entity, the operation of one or more vehicles (e.g., a fleet of vehicles), with supporting the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or items, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network(s) 108. The communications network(s) 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108. In some implementations, the one or more remote computing devices 106 can be associated with a third party such as, for example, a third-party vehicle vendor/manager with a fleet of third-party vehicles. The remote computing devices 106 can implement the computing system of the third party (e.g., for communication, coordination, operation, etc. of third-party autonomous vehicles).

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to communicate data to and/or obtain data from a vehicle, and determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, light electric vehicle, bicycle, scooter, etc.), an aircraft, and/or another type of vehicle (e.g., watercraft, etc.). The vehicle 102 can be an autonomous vehicle that can perform various actions including driving, navigating, flying, and/or operating, with minimal and/or no interaction from a human operator (local and/or remote). The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, or alternatively, the vehicle 102 can provide data indicative of the state of the vehicle, the state of one or more passengers of the vehicle, and/or the state of an environment to the operations computing system 104, which can store an indication, record, and/or other data indicative of the state of the one or more objects (e.g., within a predefined distance of the vehicle 102) in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those of the vehicle described herein.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more sensors 114 can include a Light Detection and Ranging (LIDAR) system, a Radio Detection and Ranging (RADAR) system, one or more cameras (e.g., visible spectrum cameras and/or infrared cameras), audio sensors (e.g., microphones, etc.), heat sensors, motion sensors, and/or other types of imaging capture devices and/or sensors. The sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, the sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto. In some implementations, the map data 122 can include high definition map data. In some implementations, the map data 122 can include sparse map data indicative of a limited number of environmental features (e.g., lane boundaries, etc.). In some implementations, the map data can be limited to geographic area(s) and/or operating domains in which the vehicle 102 (or autonomous vehicles generally) may travel (e.g., due to legal/regulatory constraints, autonomy capabilities, and/or other factors).

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device(s) 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. The perception system 124, prediction system 126, and/or motion planning system 128 can be separate systems or included within the same system. For example, the perception system 124 and the prediction system 126 can be included in a joint perception/prediction system 123. The joint perception/prediction system 123 can be configured to perform the functions of the perception system 124 and the prediction system 126 systems in a coordinated manner for improved speed, efficiency, and on-board computational resource cost. The joint perception/prediction system 123 can utilize one or more joint perception/prediction system models for performing such functions, as further described herein.

The autonomy computing system 120 can receive the sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The joint perception/prediction system 123 (e.g., a branch/portion associated with the functions of a perception system 124) can identify one or more objects that are proximate to the vehicle 102 based on sensor data 116 received from the sensors 114. In particular, in some implementations, the joint perception/prediction system 123 can determine, for each object, perception data 130 that describes a current state of such object. As examples, the perception data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the joint perception/prediction system 123 can determine perception data 130 for each object over a number of iterations. In particular, the joint perception/prediction system 123 can update the perception data 130 for each object at each iteration. Thus, the joint perception/prediction system 123 can detect and track objects (e.g., vehicles, bicycles, pedestrians, etc.) that are proximate to the vehicle 102 over time, and thereby produce a representation of the environment around an vehicle 102 along with its state (e.g., a presentation of the objects of interest within a scene at the current time along with the states of the objects).

The joint perception/prediction system 123 (e.g., a branch/portion associated with the functions of a prediction system 126) can utilize the perception data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory made of waypoints) of at least one object within the surrounding environment of the vehicle 102. For example, the predicted path (e.g., trajectory) can indicate a path along which the respective object is predicted to travel over time (and/or the velocity at which the object is predicted to travel along the predicted path). As further described herein, an autonomy output of the joint perception/prediction system 123 can include aspects of the perception data 130 (e.g., object state information, bounding shapes, etc.) and/or aspects of the prediction data 132 (e.g., predicted future location(s)/waypoint(s), predicted trajectories, etc.). The joint perception/prediction system 123 can provide the autonomy output, perception data 130, and/or prediction data 132 associated with the one or more objects to the motion planning system 128.

The motion planning system 128 can determine a motion plan and generate motion plan data 134 for the vehicle 102 based at least in part on the autonomy output, perception data 130, and/or prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion planning system 128 can plan the motion of the vehicle 102 based at least in part on an object (and its associated data) whether or not that object ultimately impacts the selected trajectory for the vehicle 102. For example, the motion planning system 128 can consider all objects and some objects may outweigh others due to proximity, type, urgency, and/or other factors (e.g., weather, failure events, etc.). The motion plan data 134 can include a planned trajectory, velocity, acceleration, and/or other actions of the vehicle 102.

As one example, in some implementations, the motion planning system 128 can determine an objective function (e.g., cost function, reward function, etc.) for each of one or more candidate motion plans for the autonomous vehicle 102 based at least in part on the current locations and/or predicted future locations and/or moving paths of the objects. For example, a cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a vehicle interface module configured to translate the motion plan data 134 into instructions. By way of example, the vehicle interface module can translate a determined motion plan data 134 into instructions for controlling the vehicle 102 including adjusting the steering of the vehicle 102 "X" degrees and/or applying a certain magnitude of braking force. The vehicle interface module can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the vehicle 102 to communicate with and/or provide and/or receive data and/or signals from a remote computing device 106 associated with a user and/or an item (e.g., an item to be picked-up for a courier service). The vehicle 102 can also utilize the communications system 136 to communicate with another vehicle, infrastructure element, and/or other system (e.g., within the vehicle's geographic area, ecosystem, network, communication range, etc.).

The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
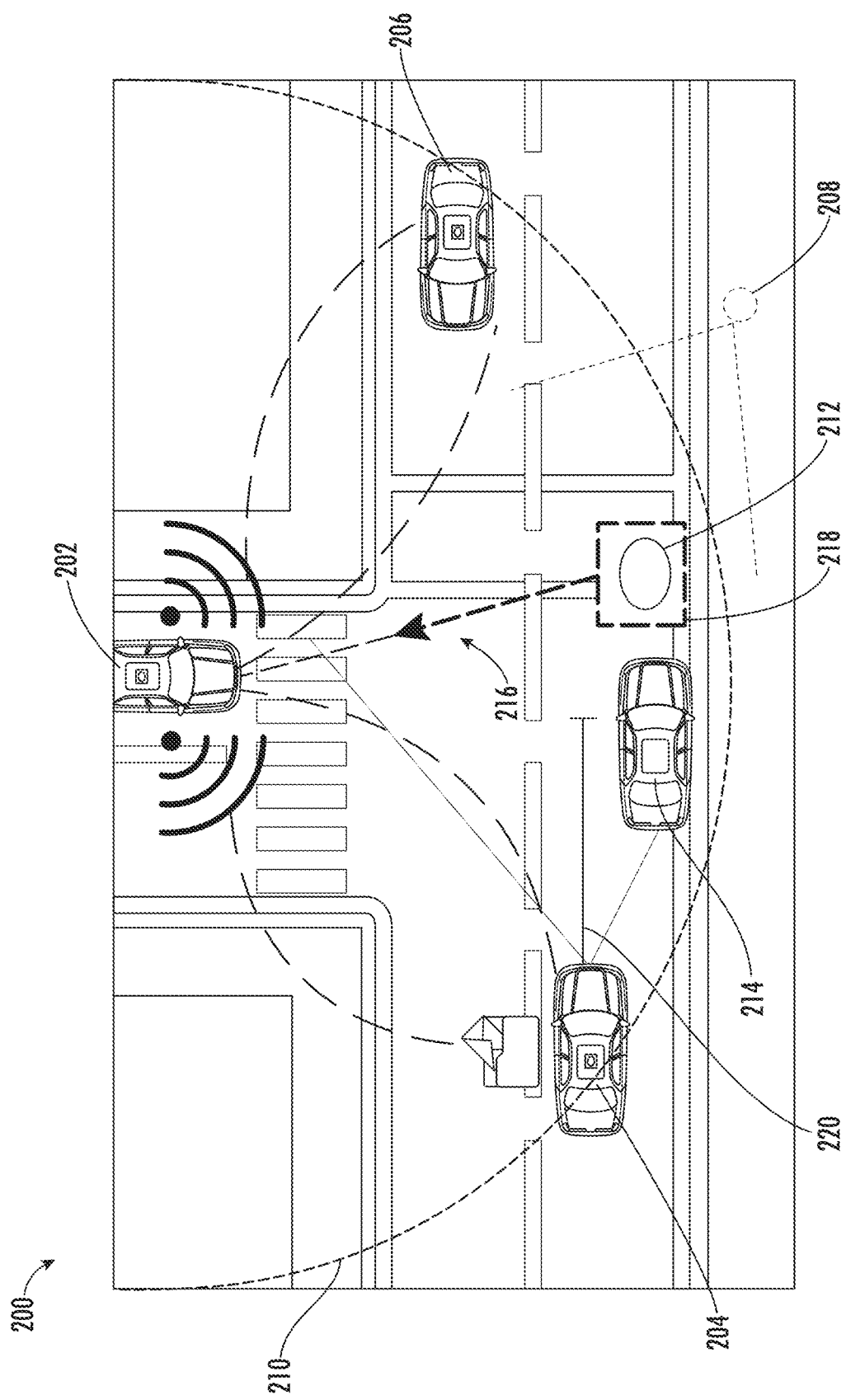
FIG. 2 depicts an example geographic area with a vehicle ecosystem according to example embodiments of the present disclosure.

Autonomous vehicles can operate within geographic areas or have operating domains that can include other autonomous vehicles. For instance, FIG. 2 depicts an example geographic area 200 with a vehicle ecosystem according to example embodiments of the present disclosure. A plurality of autonomous vehicles 202, 204, 206 can be located within the geographic area 200. The plurality of autonomous vehicles can include, for example, a first autonomous vehicle 202, a second autonomous vehicle 204, a third autonomous vehicle 206, etc. The first autonomous vehicle 202, second autonomous vehicle 204, and/or third autonomous vehicle 206 can be associated with the same fleet operator/owner or a different fleet operator/owner. The first autonomous vehicle 202, second autonomous vehicle 204, and/or third autonomous vehicle 206 can be the same or different types and/or versions of vehicle. Each of the first autonomous vehicle 202, second autonomous vehicle 204, and/or third autonomous vehicle 206 can be configured similar to the vehicle 102 described with reference to FIG. 1 and can include the same or similar vehicle computing system(s), functions, operations, etc.

In some implementations, the first autonomous vehicle 202, second autonomous vehicle 204, and/or third autonomous vehicle 206 can be utilized to provide a vehicle service. For example, an autonomous vehicle 202, 204, 206 can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s)

from a requested origin location and delivers the item to a requested destination location), and/or other types of services.

An operations computing system 104 of the service entity can help to coordinate the performance of vehicle services by autonomous vehicles 202, 204, 206. For instance, the operations computing system 104 can include a service platform. The service platform can include a plurality of back-end services and front-end interfaces, which are accessible via one or more APIs. For example, an autonomous vehicle 202, 204, 206 and/or another computing system that is remote from the autonomous vehicle (but associated therewith) can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle 202, 204, 206 to obtain data from and/or communicate data to the operations computing system. By way of example, a user can provide (e.g., via a user device) a request for a vehicle service to the operations computing system 104 associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system 104 of the service entity can process the request and identify one or more autonomous vehicles 202, 204, 206 that may be able to perform the requested vehicle services for the user. For instance, the operations computing system 104 can identify which autonomous vehicle(s) are online with the service entity (e.g., available for a vehicle service assignment, addressing a vehicle service assignment, etc.). An autonomous vehicle 202, 204, 206 can go online with a service entity by, for example, connecting with the service entity's operations computing system 104 (e.g., the service platform) so that the vehicle's computing system can communicate with the operations computing system 104 via one or more networks. Once online, the operations computing system 104 can communicate a vehicle service assignment indicative of the requested vehicle services and/or other data to the autonomous vehicle 202, 204, 206.

The geographic area 200 can include one or more travel ways (e.g., roadways, etc.) and one or more geographic features (e.g., cross walks, lane boundaries, etc.). In some implementations, the geographic area 200 can include one or more infrastructure elements 208 that include systems with communication technology capable of communicating with one or more of the autonomous vehicles 202, 204, 206 within the geographic area 200. As further described herein, the infrastructure elements 208 can provide sensor data and/or intermediate environmental representations to the autonomous vehicles 202, 204, 206. The infrastructure element(s) 208 can include, for example, a sensor suite/system attached and/or included in a building or other structure such as, for example, a lamppost, traffic light, etc.

The geographic area 200 can also include one or more objects. The objects can include, for example, static object(s) (e.g., lampposts, parking meters, etc.) and/or dynamic actor objects (e.g., pedestrians, vehicles, bicycles/bicyclists, etc.) that are and/or may be in motion. By way of example, the geographic area 200 can include an object 212. The object 212 can be within the field of view of sensors associated with one or more of the autonomous vehicles within the geographic area 200 (e.g., first autonomous vehicle 202, third autonomous vehicle). The object 212 can be occluded from a field of view of one or more sensors of the second autonomous vehicle 204. The object 212 can include, for example, a user that is associated with a service request for a vehicle service. An autonomous vehicle 202, 204, 206 can be assigned to the service request and, thus, may attempt to detect the user so that the user can board, enter, etc. the assigned autonomous vehicle, the vehicle's doors can be unlocked, the vehicle can send a message to the user, etc. In some implementations, the geographic area 200 can include one or more non-autonomous vehicles such as, for example, non-autonomous vehicle 214.

Each of the plurality of autonomous vehicles 202, 204, 206 can include a communication system that allows the respective vehicle's computing system to communicate with system(s) that are remote from the autonomous vehicle 202, 204, 206. For example, an autonomous vehicle 202, 204, 206 can utilize its communication system to send and receive data (e.g., via an internet connection) from a cloud-based server system that helps support the autonomous vehicle 202, 204, 206. This can include, for example, an offboard service assignment system that matches the autonomous vehicle to a request for a vehicle service (e.g., rideshare service), a routing system that provides the autonomous vehicle 202, 204, 206 with a route to follow for performing the vehicle service, a remote assistance system that can provide remote assistance to a vehicle, and/or other systems.

Each autonomous vehicle 202, 204, 206 can also have a communication range that allows the autonomous vehicle 202, 204, 206 to communicate with systems nearby the autonomous vehicle 202, 204, 206. For example, a first autonomous vehicle 202 can have a first communication range 210. The first communication range 210 can be based at least in part on the vehicle's communication hardware (e.g., antenna, etc.). Additionally, or alternatively, the first communication range 210 can be based at least in part on the communication protocol utilized by the first autonomous vehicle 202. The first communication range 210 can be represented by a radial distance from the first autonomous vehicle 202. The first autonomous vehicle can communicate to the autonomous vehicle(s) within the first communication range 210. For example, the first autonomous vehicle 202 (a "transmitter autonomous vehicle") can communicate data to the second autonomous vehicle 204 ("a recipient autonomous vehicle" that is different from the first autonomous vehicle 202) that is within the first communication range 210 of the first autonomous vehicle 202.

The systems and methods of the present disclosure can allow the ecosystem of autonomous vehicles/systems within a geographic area 200 to provide inter-vehicle/system communications that improve the vehicles'/systems' autonomous operations while reducing the communication bandwidth and potential information loss associated with doing so.

Figure 3:
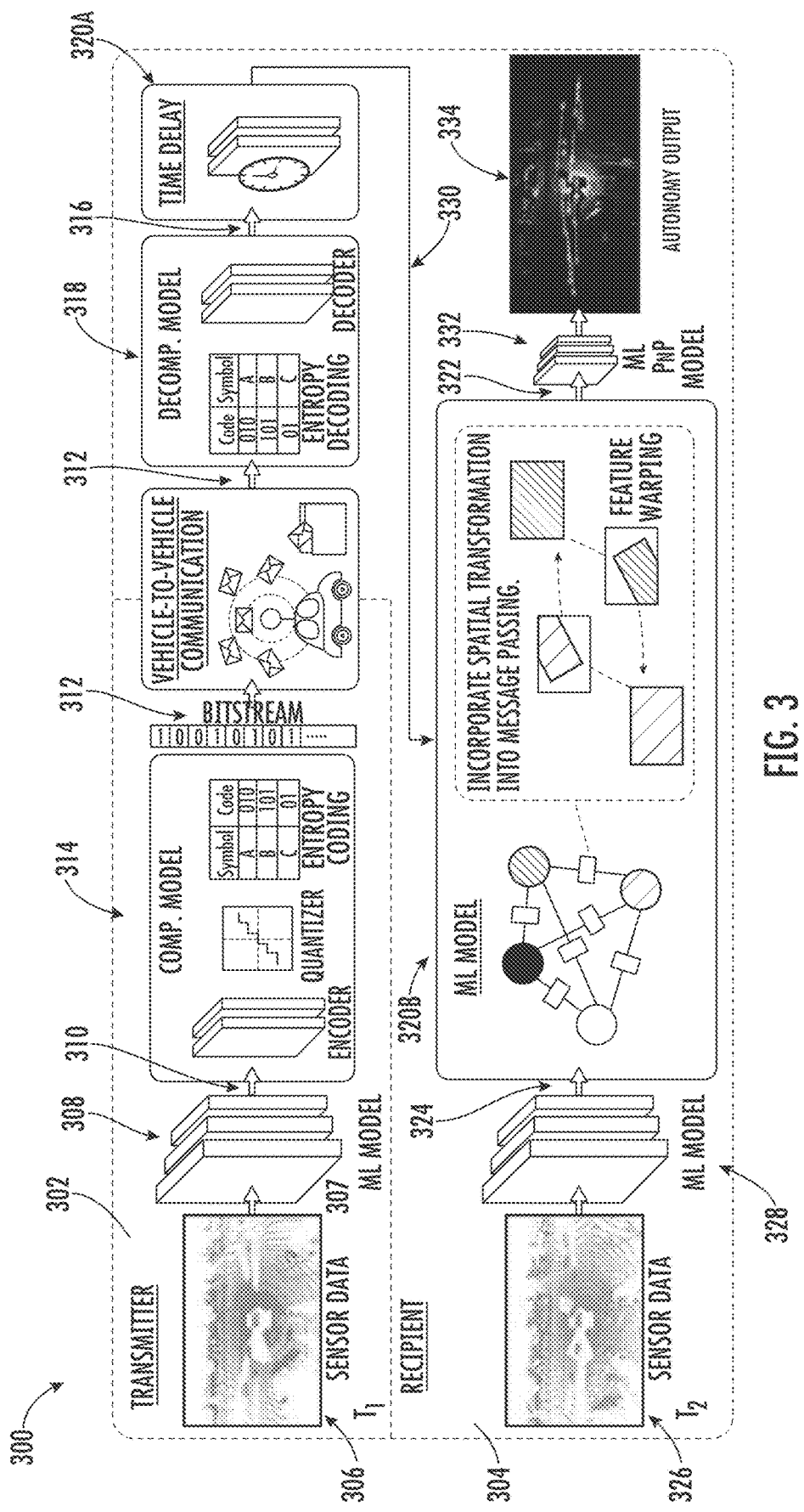
FIG. 3 depicts an architecture of example machine-learned models according to example embodiments of the present disclosure.

FIG. 3 depicts a diagram of an architecture 300 of example machine-learned model(s) that can allow for such improvements. The diagram illustrates the architecture 300 across two systems. This can include a transmitter system 302 and a recipient system 304. In some implementations, the transmitter system 302 can include a first/transmitter autonomous vehicle 202 (e.g., its onboard vehicle computing system) and the recipient system 304 can include a second/recipient autonomous vehicle 204 (e.g., its onboard vehicle computing system).

As described herein, the transmitter system 302 can be a first computing system of a vehicle, robot, infrastructure element, etc. and the recipient system 304 can be a second computing system of another vehicle, robot, infrastructure element, etc. For example illustration purposes only, the follow description is provided within the example context of the first and second autonomous vehicles 202, 204 communicating with one another.

For instance, the transmitter system 302 (e.g., a first/transmitter autonomous vehicle 202, its onboard vehicle computing system) can obtain (e.g., via the one or more sensors of the first autonomous vehicle 202) sensor data 306 associated with an environment of the transmitter system 302 (e.g., the first autonomous vehicle 202). The sensor data 306 can include one or more types of sensor data associated with one or more sensor modalities. For example, the sensor data 306 can include three-dimensional point cloud data (e.g., three-dimensional LIDAR point cloud data.). In some implementations, the sensor data 306 can include a fusion of different types of sensor data. For example, the sensor data 306 can include a first type of sensor data (e.g., camera image data) and a second type of sensor data (e.g., LIDAR data). The first type of sensor data can be associated with a first sensor modality (e.g., stereo camera) and the second type of sensor data (e.g., LIDAR data) can be associated with a second sensor modality (e.g., LIDAR system).

In some implementations, the sensor data 306 can include data acquired by multiple different systems (e.g., autonomous vehicles). For example, the sensor data 306 can include a first set of sensor data (e.g., a first set of LIDAR data) acquired by the transmitter system 302 (e.g., the first autonomous vehicle 202) and a second set of sensor data (e.g., a second set of LIDAR data) that was acquired by another system (e.g., another autonomous vehicle 204, 206) in its ecosystem and sent to the transmitter system 302 (e.g., the first autonomous vehicle 202).

Figure 4:
FIG. 4 depicts a visualization of an example intermediate environmental representation according to example embodiments of the present disclosure.

The transmitter system 302 (e.g., the first autonomous vehicle 202, its onboard computing system) can determine a first intermediate environmental representation 310 of at least a portion of the environment of the transmitter system 302 (e.g., first autonomous vehicle 202) based at least in part on the sensor data 306. An intermediate representation can be a result from one or more intermediate network layers (e.g., of a neural network). This can include, for example, intermediate layers of a neural network that has been trained/configured for perception and/or prediction purposes, as further described herein. Additionally, or alternatively, the intermediate representation can be a result of other types of networks. The first intermediate environmental representation 310 can include a feature map indicative of at least a portion of the environment of the transmitter system 302 (e.g., the first autonomous vehicle 202). This portion of the environment can be, for example, a portion of the first autonomous vehicle's environment that can be captured within a field of view (or a portion thereof) of the vehicle's sensor(s) and represented in the sensor data 306. FIG. 4 depicts a visualization of an example intermediate environmental representation 400 according to example embodiments of the present disclosure.

To determine the first intermediate environmental representation 310, the transmitter system 302 (e.g., the first autonomous vehicle 202) can generate voxelized sensor data 307 based at least in part on the sensor data 306. For example, the transmitter system 302 (e.g., the first autonomous vehicle 202) can generate voxelized sensor data 307 by voxelizing the three-dimensional point cloud data of the sensor data 306. By way of example, the transmitter system 302 can extract raw features from its LIDAR sensor data and transform them into a bird's eye view (BEV). The features can include, for example, a heading and/or shape of an object (e.g., object 212) indicated in the intermediate environmental representation 310. The transmitter system 302 can voxelize the LIDAR point clouds (e.g., in 15 cm$^3$) and, as described herein, output feature maps of shape H×W×C, where H×W denotes the scene range in BEV, and C is the number of feature channels.

The transmitter system 302 (e.g., the first autonomous vehicle 202) can determine an intermediate environmental representation of at least a portion of the environment of the transmitter system 302 (e.g., the first autonomous vehicle 202) based at least in part on the sensor data 306 and a machine-learned model 308. For example, the transmitter system 302 (e.g., the first autonomous vehicle 202) can generate the first intermediate environmental representation 310 based at least in part on the voxelized sensor data 307 and the machine-learned model 308. The transmitter system 302 (e.g., the first autonomous vehicle 202) can input the voxelized sensor data 307 into a machine-learned model 308 (e.g., a convolutional neural network, etc.) configured to apply one or more convolutional layers to the voxelized sensor data 307. For example, the machine-learned model 308 can utilize a plurality of layers (e.g., three layers, etc.) of 3×3 convolution filters (e.g., with strides of 2, 1, 2 respectively) to produce a first intermediate environmental representation 310. The first intermediate environmental representation 310 can be, for example, a 4× downsampled spatial feature map. The feature map can be represented as a matrix generated from the array(s) of the sensor data 306. The transmitter system 302 (e.g., the first autonomous vehicle 202) can receive the first intermediate environmental representation 310 as an output of the machine-learned model 308.

The transmitter system 302 (e.g., the first autonomous vehicle 202, its onboard vehicle computing system) can generate a first compressed intermediate environmental representation 312 by compressing the first intermediated environmental representation 310 of at least the portion of the environment of the transmitter system 302 (e.g., the first autonomous vehicle 202). For instance, the transmitter system 302 can include a machine-learned compressor model 314. The machine-learned compressor model 314 can include an encoder, a quantizer, and entropy coding. A variational image compression algorithm can be used, where a convolutional neural network learns to compress an input (e.g., the first intermediate environmental representation 310) with the help of a learned hyperprior. The latent representation can then be quantized and further encoded losslessly. The feature map of the first intermediate environmental representation 310 (e.g., a rectangular tensor) can be compressed into a bitstream. In some implementations, the machine-learned model that produces an intermediate environment representation can also be trained/configured to compress the intermediate environment representation (e.g., include one or more compression layers).

The transmitter system 302 (e.g., the first autonomous vehicle 202, its onboard vehicle computing system, etc.) can determine a recipient to which to communicate the first compressed intermediate environmental representation 310 from among a plurality of potential recipients. The transmitter system 302 can select the recipient system based at least in part on a communication range of the transmitter system 302. For instance, the transmitter system 302 can determine that it will communicate the first compressed intermediate environmental representation 312 to one or more of the other computing systems within its communication range. By way of example, the first autonomous vehicle 202 can select the second autonomous vehicle 204, from among a plurality of autonomous vehicles, based at least in part on a communication range 210 of the first autonomous vehicle 202. The second autonomous vehicle 204 can be within the communication range 210 of the first autonomous vehicle 202. Thus, the transmitter system 302 can communicate the first compressed intermediate environmental representation 312 to a particular selected recipient system (e.g., peer-to-peer communication, etc.).

In some implementations, the transmitter system 302 can communicate the first compressed intermediate environmental representation 312 in a broadcast manner. For example, the transmitter system 302 (e.g., the first autonomous vehicle 202, etc.) can communicate the first compressed intermediate environmental representation 312 to recipient system(s) (e.g., other vehicles, etc.) by broadcasting the first compressed intermediate environmental representation 312 (e.g., in a broadcast data packet, etc.) to any recipient system(s) within the broadcast range (e.g., within 50, 100, 200, 500, 1000 meters, etc.). The recipient system(s) can be listening for such communications.

Additionally, or alternatively, the transmitter system 302 can select a recipient based on the recipient's ability to utilize/process compressed intermediate environmental representations. For instance, the first autonomous vehicle 202 can select the second autonomous vehicle 204, from among a plurality of autonomous vehicles, based at least in part on data indicating that the second autonomous vehicle 204 is capable of decompressing the compressed intermediate environmental representation 312. For example, there can be a plurality of autonomous vehicles 204, 206 within the communication range 210 of the first/transmitter autonomous vehicle 202. In some implementations, only a subset of those autonomous vehicles may be capable of processing the compressed intermediate environmental representation 312. For example, only some of the autonomous vehicles may have the systems/technology/models needed to decompress compressed intermediate environmental representations 312 in the manner described herein. The first autonomous vehicle 202 may communicate with the other autonomous vehicles (e.g., when entering the vehicle's communication range 210, periodically, etc.) to determine which of the autonomous vehicles 204, 206 are able to utilize intermediate environmental representations. This can include, for example, an exchange of identifiers, information, and/or other data indicating that a respective autonomous vehicle is able to transmit, receive, and/or process compressed intermediate environmental representations in the manner described herein. For example, the first autonomous vehicle 202 can select the second autonomous vehicle 204, which is configured to decompress the compressed intermediate environmental representation 312 and utilize the intermediate environmental representation 310 for one or more autonomous operations of the second autonomous vehicle 204. This capability of the second autonomous vehicle can be indicated by data received at the first autonomous vehicle 202.

The transmitter system 302 (e.g., the first autonomous vehicle 202, it's onboard vehicle computing system) can communicate the first compressed intermediate environmental representation 312 to the recipient system 304 (e.g., the second autonomous vehicle 204, it's onboard vehicle computing system). The first compressed intermediate environmental representation 312 can also be associated with a first time $T_1$. For example, the first time $T_1$ can be associated with a sensor timestamp of the transmitter system 302 (e.g., the first autonomous vehicle 202). The sensor timestamp can be indicative of when the sensor data 306 (e.g., utilized to generate the first intermediate environmental representation 310) was acquired by the sensors of the transmitter system 302 (e.g., first autonomous vehicle 202).

The recipient system 304 (e.g., the second autonomous vehicle 204, it's onboard computing system, etc.) can obtain the first compressed intermediate environmental representation 312, from the transmitter system 302 (e.g., the first autonomous vehicle 202, it's onboard vehicle computing system). The first compressed intermediate environmental representation 312 can be indicative of at least a portion of an environment of the recipient system 304 (e.g., the second autonomous vehicle 204). For example, the first compressed intermediate environmental representation 312 can be a compressed feature map that was generated on sensor data captured with a field of view for at least a portion of the environment of the recipient system's 304. The recipient system 304 (e.g., the second autonomous vehicle 204) can also obtain compressed intermediate environmental representations from one or more other transmitter systems (e.g., autonomous vehicle 206, infrastructure element 208, etc.).

The recipient system 304 (e.g., the second autonomous vehicle 204, it's onboard computing system, etc.) can generate a first decompressed intermediate environmental representation 316 by decompressing the first compressed intermediate environmental representation 312. For instance, the recipient autonomous vehicle can include a decompressor model 318 that includes a decoder and entropy decoding techniques. The first decompressed intermediate environmental representation 316 can be generated via the application of the decompressor model 318.

The recipient system 304 (e.g., the second autonomous vehicle 204, it's onboard computing system, etc.) can determine, using one or more machine-learned models 320A-B, an updated intermediate environmental representation 322 based at least in part on the first decompressed intermediate environmental representation 316 (e.g., originally generated by the first autonomous vehicle 202) and a second intermediate environmental representation 324 generated by the recipient system 304 (e.g., the second autonomous vehicle 204, etc.). The recipient system 304 (e.g., the second autonomous vehicle 204, etc.) can obtain the second intermediate environmental representation 324 generated by the recipient system 304 (e.g., the second autonomous vehicle 204, etc.). For instance, the second intermediate environmental representation 324 can be generated by the recipient system 304 in a manner similar to that previously described with respect to the transmitter system 302. By way of example, the recipient system 304 (e.g., the second autonomous vehicle 204, etc.) can obtain sensor data 326 via one or more sensors of the recipient system 304 (e.g., the second autonomous vehicle 204, etc.). The recipient system 304 (e.g., the second autonomous vehicle 204, etc.) can determine the second intermediate environmental representation 324 based at least in part on the sensor data 326 obtained via the one or more sensors of the recipient system 304 (e.g., the second autonomous vehicle 204, etc.). This can be done utilizing a machine-learned model 328 that is configured/trained similar to or the same as the machine-learned model 308 (of the transmitter system 302). For example, the machine-learned model 328 can be configured to extract features from the sensor data (e.g., from voxelized three-dimensional sensor data) to create a downsampled spatial feature map.

In some implementations, the one or more models 320A-B used to create the updated intermediate environmental representation 322 can include a machine-learned time correction model 320A. The machine-learned time correction model 320A can include, for example, a neural network. The machine-learned time correction model 320A can be a time delay correction model configured to adjust the first decompressed intermediate environmental representation 316 to account for a time delay.

For instance, as described herein, the first compressed intermediate environmental representation 312 can be based at least in part on sensor data 306 acquired by the transmitter system 302 (e.g., the first autonomous vehicle 202) at a first time $T_1$. The first time can be, for example, associated with a sensor timestamp of the first autonomous vehicle 202. This can be a sensor timestamp reflecting the time at which the sensor acquired the sensor data 306. The machine-learned time correction model 320A can be configured to compensate for time differences between a plurality of times. For instance, the recipient system 304 (e.g., the second autonomous vehicle 204, etc.) can determine, using the machine-learned time correction model 320A, a first time-corrected intermediate environmental representation 330 based at least in part on the first decompressed intermediate environmental representation 316. The first time-corrected intermediate environmental representation 330 can be adjusted based at least in part on a time difference between the first time $T_1$ and a second time $T_2$ associated with the recipient system 304 (e.g., a second autonomous vehicle 204, etc.). The second time can be, for example, indicative of a time at which the recipient system 304 intends to perceive the environment, a time at which the recipient system 304 has acquired its own sensor data to be used for autonomous operations (as described herein), and/or another time. The first time $T_1$ and the second time $T_2$ can be based on similar time scales/references to help ensure accuracy. For example, the first time $T_1$ and the second time $T_2$ can be based on global positioning system data. Accordingly, the first time-corrected intermediate environmental representation 330 can account for a time delay associated with the first compressed intermediate environmental representation 312 obtained from the transmitter system 302 (e.g., first autonomous vehicle 202) via the use of one or more machine-learned models (e.g., a time delay correction model, etc.).

In some implementations, the recipient system 304 and the transmitter system 302 can include different types of sensor(s). For example, the transmitter system 302 can include one or more different types of sensors (e.g., cameras, RADAR, LIDAR, etc.) than the recipient system 304. Thus, an intermediate environmental representation generated by (and communicated from) the transmitter system 302 can be based at least in part on one or more different types of sensor data than an intermediate environmental representation generated by the recipient system 304. Thus, using intermediate environmental representations as described herein provides the advantage of allowing the systems to aggregate environmental representations generated from different sensor/sensor data. This type of sensor agnostic approach can allow for greater flexibility in the described inter-system communications.

The recipient system 304 (e.g., the second autonomous vehicle 204, etc.) can perform one or more autonomy operations (e.g., of the second autonomous vehicle 204, etc.) based at least in part on the first time-corrected intermediate environmental representation 330. For instance, the recipient system 304 (e.g., a second autonomous vehicle 204, etc.) can input the first decompressed first intermediate environmental representation 316 into the machine-learned time correction model 320A (e.g., neural network) and can obtain the first time-corrected intermediate environmental representation 330 as an output of the machine-learned time correction model 320A. The recipient system 304 (e.g., a second autonomous vehicle 204, etc.) can generate an updated intermediate environmental representation 322 based at least in part on the first time-corrected intermediate environmental representation 330. For example, as further described herein, the recipient system 304 (e.g., the second autonomous vehicle 204, etc.) can aggregate, using a machine-learned aggregation model 320B, the first time-corrected intermediate environmental representation 330 and a second intermediate environmental representation 324 generated by the recipient system 304 (e.g., the second autonomous vehicle 204, etc.). The recipient system 304 (e.g., the second autonomous vehicle 204, etc.) can generate an autonomy output 334 based at least in part on the first time-corrected intermediate environmental representation 330. For example, the recipient system 304 (e.g., the second autonomous vehicle 204, etc.) can generate an updated intermediate environmental representation 322 based at least in part on the first time-corrected intermediate environmental representation 330 and generate the autonomy output 334 based at least in part on updated intermediate environmental representation. As further described herein, the autonomy output 334 can be indicative of, for example, perception data and prediction data associated with the recipient system 304 (e.g., the second autonomous vehicle 204, etc.).

The one or more models used to create the updated intermediate environmental representation can include a machine-learned aggregation model 320B. The machine-learned aggregation model 320B can be configured to aggregate a plurality of intermediate environmental representations from a plurality of sources (e.g., autonomous vehicles). For instance, the recipient system 304 (e.g., a second autonomous vehicle 204, etc.) can determine, using the machine-learned aggregation model 320B, an updated intermediate environmental representation 322 based at least in part on the first decompressed intermediate environmental representation 316 and the second intermediate environmental representation 324. As described herein, the first decompressed intermediate environmental representation 316 can be adjusted to account for the time delay (using a time delay correction model). Thus, the machine-learned aggregation model 320B can utilize the first time-corrected intermediate environmental representation 330 version of the first decompressed intermediate environmental representation 316. By way of example, the recipient system 304 (e.g., the second autonomous vehicle 204, etc.) can input the first decompressed intermediate environmental representation 316 (e.g., the first time-corrected intermediate environmental representation 330 version) and the second intermediate environmental representation 324 (e.g., generated by the second autonomous vehicle 204) into the machine-learned aggregation model 320B. The machine-learned aggregation model 320B can be configured to aggregate the first decompressed intermediate environmental representation 316 (e.g., the first time-corrected intermediate environmental representation 330 version) and the second intermediate environmental representation 324 to generate the updated intermediate environmental representation 322. The machine-learn aggregation model 320B can ingest other intermediate environmental representations received from other systems (e.g., vehicles, infrastructure elements, etc.) as well. The recipient system 304 (e.g., a second autonomous vehicle 204, etc.) can obtain the updated intermediate environmental representation 322 as an output of the machine-learned aggregation model 320B.

Figure 5:
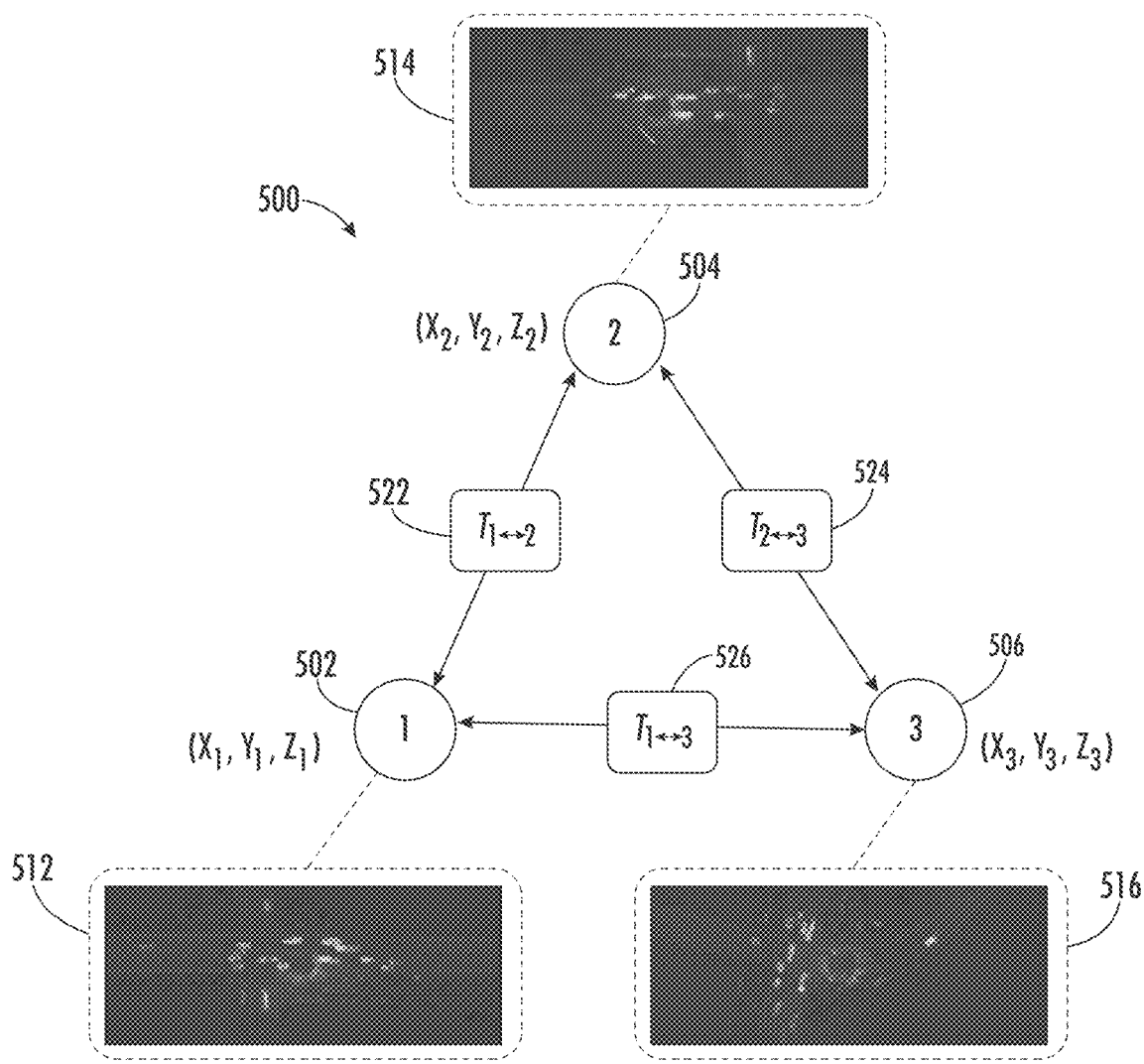
FIG. 5 depicts a diagram of an example graph neural network according to example embodiments of the present disclosure.

The machine-learned aggregation model 320B can include a graph neural network. For example, FIG. 5 depicts a diagram of an example graph neural network 500 according to example embodiments of the present disclosure. The graph neural network 500 can include a plurality of nodes 502, 504, 506 each corresponding to a respective system (e.g., autonomous vehicle) of the plurality of systems (e.g., autonomous vehicles) within the ecosystem/network. This can include, for example, vehicles within the communication range of the recipient system 304 (e.g., the second autonomous vehicle 202). The plurality of systems can be, for example, a plurality of autonomous vehicles including the first autonomous vehicle 202 and the second autonomous vehicle 204. For example, a first node 502 can represent the first autonomous vehicle 202, a second node 504 can represent the second autonomous vehicle 204, a third node 506 can represent a third autonomous vehicle 206. Each respective autonomous vehicle 202, 204, 206 can be associated with a respective set of spatial coordinates (e.g., cartesian, radial, etc.). Each set of spatial coordinates can be represented by its associated node. By way of example, the first node 502 can represent the first autonomous vehicle 202 (the transmitter) and be associated with spatial coordinates that represent the position of the first autonomous vehicle 202 relative to the second autonomous vehicle 204 (the recipient), within the environment of the second autonomous vehicle 204.

Each transmitter/recipient system within an ecosystem can include a graph neural network that is associated with that particular system. Each transmitter/recipient system can include a different graph neural network. For example, a first graph neural network (and the nodes therein) of the first autonomous vehicle 202 can be different than a second graph neural network (and the nodes therein) of the second autonomous vehicle 204. The nodes of the first graph neural network of the first autonomous vehicle 202 can be reflective of that vehicle's point of view and the systems/vehicles within its ecosystem (e.g., communication range, etc.). The nodes of the second graph neural network of the second autonomous vehicle 202 can be reflective of that vehicle's point of view and the systems/vehicles within its ecosystem (e.g., communication range, etc.).

The machine-learned aggregation model 320B can be configured to transform an intermediate environmental representation 512, 514, 516 based at least in part on a set of spatial coordinates associated with its respective system (e.g., the nodes 502, 504, 506 representing those systems). For instance, the machine-learned aggregation model 320B can be configured to transform the first decompressed intermediate environmental representation 316 (e.g., the first time-corrected intermediate environmental representation 330 version) based at least in part on a set of spatial coordinates associated with the transmitter system 302 (e.g., the first autonomous vehicle 202, node 502).

The machine-learned aggregation model can be configured to initialize a node state of at least one node of the graph neural network 500 and to update the node state of the at least one node based at least in part on a spatial transformation. For example, in the graph neural network 500, each node 502, 504, 506 can maintain a state representation. At each iteration (of a plurality of iterations), messages can be sent between nodes 502, 504, 506 of the graph and the node states for each node 502, 504, 506 can be updated based on the aggregated received information (e.g., of the messages) using a neural network. Graphs for different systems (e.g., autonomous vehicles) can be different, as each system can receive communications from one or more different systems. For example, the set of vehicles within one vehicle's communication range may be different than the vehicles within another vehicle's communication range.

As described herein, the recipient system 304 (e.g., the second autonomous vehicle 204) can compensate for a time delay 522, 524, 526 between systems within an ecosystem/network (e.g., plurality of vehicles, infrastructure elements, etc.), which can be used to create an initial state for each node 502, 504, 506 in the graph. For a system (e.g., an autonomous vehicle) defined as node i, the recipient system 304 can apply a convolutional neural network that takes as input the decompressed intermediate environmental representation $\hat{z}_i$ and time delay $\Delta t_{i \to k}$ with respect to the recipient system 304. The recipient system 304 can take the representation and concatenate with zeros to augment the capacity of the node state in order to aggregate the information received from other systems after propagation. The initial node state $h_i^{(O)}$ can be represented as follows (where $\|$ indicates concatenation):

$$h_i^{(O)} = CNN(\hat{z}_i, \Delta t_{i \to k}) \| 0$$

The recipient system 304 can perform message passing to share features between nodes 502, 504, 506. At iteration l, for a node i sending a message $m_{i \to k}^{(l)}$ to another node k, the recipient system 304 can apply a relative spatial transformation $\xi_{i \to k}$ to warp the state at node i to the feature space of node k:

$$m_{i \to k}^{(l)} = T(h_i^{(l)}, \xi_{i \to k}) \cdot M_{i \to k}$$

where T applies the spatial transformation and resampling of the feature state via bilinear-interpolation, and $M_{i \to k}$ masks out out-of-bound regions after warping. This can be helpful, for instance, because portions of the transmitter system's features may be further away than the recipient system's current range.

The recipient system 304 can aggregate the received messages at node i via an aggregation function $\varphi$ (e.g., sum, mean, pooling) and update the node state with a ConvGRU:

$$h_i^{(l+1)} ConvGRU(h_i^{(l)}, \varphi([\forall_{j \in N(i)}, m_{j \to i}^{(l)}]))$$

where $j \in N(i)$ are the neighboring nodes in the network for node i and $\varphi$ is the mean operator. After the final iteration, a multilayer perceptron can output the updated intermediate environmental representation:

$$z_j^{(L)} = MLP(h_j^{(L)})$$

Retuning to FIG. 3, the recipient system 304 can generate (e.g., using a machine-learned perception and prediction model 332) an autonomy output 334 for the recipient system 304 (e.g., the second autonomous vehicle 204) based at least in part on the updated intermediate environmental representation 322. The autonomy output 334 can be indicative of an object 212 within the environment of the recipient system 304 (e.g., second autonomous vehicle 204) and one or more predicted future locations 216 (e.g., shown in FIG. 2) of the object 212. The autonomy output 334 can be indicative of a bounding shape 218 (e.g., shown in FIG. 2) associated with an object 212 within the environment of the recipient system 304 (e.g., the second autonomous vehicle 204). The one or more predicted future locations 216 of the object 212 can include one or more waypoints (at one or more future times) and can be expressed as a predicted motion trajectory of the object 212. In some implementations, the object 212 can be occluded from a field of view of one or more sensors of the recipient system 304 (e.g., the second autonomous vehicle 204).

To generate the autonomy output, the recipient system 304 (e.g., the second autonomous vehicle 204) can utilize a machine-learned perception and prediction model 332. The machine-learned perception and prediction model 332 can be configured to generate the autonomy output(s) 334.

The recipient system 304 (e.g., second autonomous vehicle 204) can input the updated intermediate environmental representation 322 into the machine-learned perception and prediction model 332. The recipient system 304 (e.g., second autonomous vehicle 204) can obtain the autonomy output 334 as an output of the machine-learned perception and prediction model 332. For instance, the recipient system 304 (e.g., second autonomous vehicle 204) can apply a set of four convolutional blocks to extract a high-level representation suitable for a perception and prediction task. The block helps to capture multi-scale context efficiently, which can be helpful for the prediction function. A feature map can be used with two network branches that output detection and motion forecasting estimates respectively. The output of the detection branch can be parameterized as (x, y, w, h, θ), which denotes the position, size and orientation of objects. This can be represented as a bounding shape 218 (e.g., shown in FIG. 2) associated with an object 212 within the environment of the recipient system 304 (e.g., second autonomous vehicle 204). The output of the prediction branch can be parameterized as (xt, yt), which denotes the object's location at future time step t. This can indicate one or more future location(s) 216 of the object 212. The autonomy output 334 can be indicative of the output of the detection branch and the prediction branch (e.g., a bounding shape and predicted future location(s)). The machine-learned perception and prediction model 332 can be used by or included in the joint perception/prediction system 123 of the vehicle computing system 112.

Figure 6:
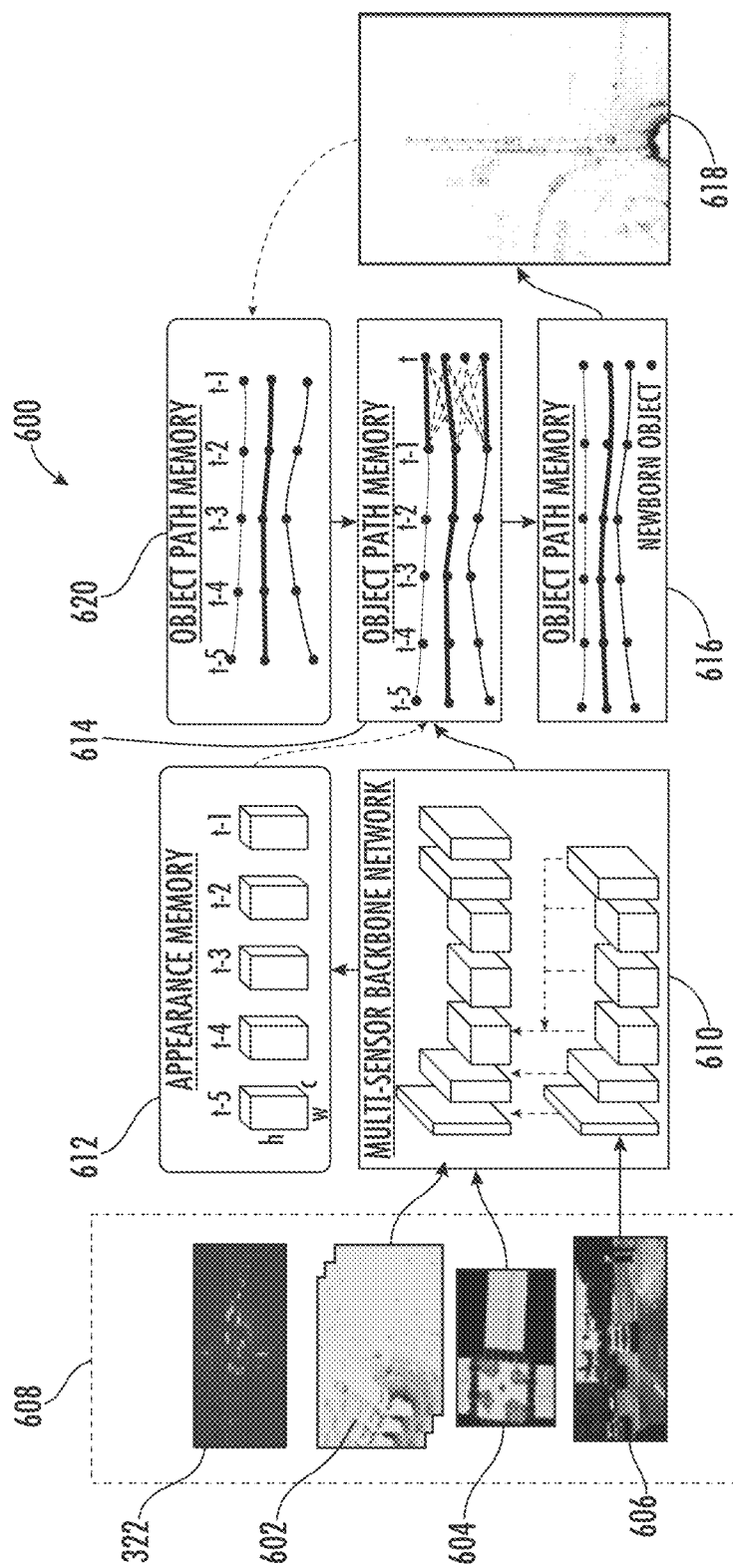
FIG. 6 depicts an architecture of example machine-learned models according to example embodiments of the present disclosure.

FIG. 6 depicts an architecture 600 of example machine-learned models according to example embodiments of the present disclosure. The architecture 600 can represent an example architecture for the machine-learned perception and prediction model 332. The joint perception and prediction model can include several memories and networks. For example, the architecture 600 can include a plurality of network branches (e.g., a branch for perception, a branch for prediction, etc.), a plurality of memories (e.g., an appearance memory, object path memory, etc.) as well as an object path proposal network and a path refinement network. FIG. 6 depicts input data 608 that can include an updated intermediate environment representation 322 (e.g., based on an aggregation of a plurality of intermediate environment representations from a plurality of systems). The input data 608 can also, or alternatively, include other sensor data such as, for example, LiDAR data 602, map data 604, image data 606. The architecture 600 can include model(s) 610 (including the plurality of branches), an appearance memory 612, one or more path proposal models 614, one or more path refinement models 616, output data 618, and object path memory 620.

The LiDAR data 602 can include LiDAR point cloud data generated by one or more LiDAR devices that detect an environment around the one or more LiDAR devices. The LiDAR data 602 can include a three-dimensional representation of the environment. The three-dimensional representation of the environment can include a set of three-dimensional points (e.g., x, y, and z coordinates) that indicate the location of surfaces in the environment. For example, the LiDAR data 602 can include a three-dimensional representation of an environment including the locations of one or more objects in that environment (e.g., one or more objects including pedestrians, vehicles, roads, and/or buildings). Further, the LiDAR data 602 can be based at least in part on one or more LiDAR sweeps by one or more LiDAR devices mounted on a system (e.g., an autonomous vehicle) that traverses/is located with the environment.

The map data 604 can include information associated with the state of an environment (e.g., a geographic area) including the locations (e.g., latitude, longitude, and/or altitude) and/or dimensions (e.g., length, width, and/or height) of one or more objects and/or features of the environment. In some embodiments, the map data 604 can include a bird's eye representation of a geographic area. For example, the map data 604 can include a top-down representation of an environment that includes information associate with the relative location of features including roads, sidewalks, and/or buildings. Further, the map data 604 can be defined relative to an ego vehicle as the ego vehicle traverses the environment depicted by the map data 604. Based at least in part on ego motion information associated with the ego vehicle, the locations of one or more objects (e.g., locations of the one or more objects relative to the ego vehicle and/or a latitude and/or longitude associated with of the one or more objects) in the environment can be determined.

The image data 606 can include information associated with one or more images of an environment. The one or more images associated with the image data 606 can include various image formats including raster (e.g., bitmap), vector, and/or voxel image formats. Further, the one or more images can be two-dimensional images of an environment captured from an angle determined by the position of the respective image capture device (e.g., a camera). For example, the image data 606 can include one or more RGB images of an environment captured by a camera. Further, the image data 606 can be based at least in part on images captured by one or more cameras mounted on a system (e.g., an autonomous vehicle) that traverses/is located within the environment.

The one or more models 610 can include one or more machine-learned models (e.g., one or more recurrent neural networks, etc.) that are configured to: receive one or more inputs including one or more portions of the input data 608; perform one or more operations associated with the one or more inputs including extracting one or more motion features and/or one or more motion features from the one or more objects represented by the input data 608; and generate one or more outputs including a set of feature maps that can be stored in the appearance memory 612 and/or provided as an input to the path proposal model 614.

For example, the input data 608 can be provided as input to the one or more models 610, which store output (one or more feature maps representing an environment associated with the input data 608 over a plurality of time intervals) in the appearance memory 612. The feature map(s) generated by the model(s) 610 can include appearance features and/or motion features of the one or more objects in the environment (e.g., vehicles, pedestrians, etc.) associated with the input data 608. Further, the one or more models 610 can generate a plurality of temporal instance representations associated with the appearance and/or motion of the one or more objects represented in the plurality of feature maps.

The appearance memory 612 can store information and/or data associated with the appearance of one or more objects that were previously detected and/or previously represented by the input data 608. For example, the appearance memory 612 can include a plurality of feature maps associated with a detected environment, in which each feature map includes information associated with the appearance of one or more objects at a time interval of a plurality of time intervals (e.g., sequential time intervals).

The object path memory 620 can store information and/or data associated with one or more paths (e.g., a set of locations at which an object was present at and corresponding time intervals in the past) corresponding to each of the one or more objects that were previously detected and/or previously represented by the input data 608. For example, the object path memory 620 can include feature map(s) associated with a detected environment, in which each feature map includes information associated with the geographic location (e.g., latitude, longitude, and/or altitude) of each of the one or more objects at a time interval of a plurality of time intervals (e.g., sequential time intervals).

The plurality of temporal instance representations generated as output by the one or more models 610 can be provided as an input to the one or more path proposal models 614 (e.g., one or more recurrent neural networks). The one or more path proposal models 614 can be configured and/or trained to generate (based on the plurality of temporal instance representations) output including one or more path proposals for the one or more objects associated with the plurality of temporal instance representations. The one or more path proposals can be based at least in part on optimizing matches between previous paths of the one or more objects and current detections of the one or more objects. The one or more path proposals can include one or more candidate paths for the one or more objects. When multiple candidate paths are associated with a single object, the multiple candidate paths can be merged and can include overlapping candidate paths, which can later be refined into a single path by the one or more path refinement models 616. In some embodiments, each of the one or more objects can be associated with more than one candidate paths, which can be refined by the one or more path refinement models 616 that can be configured and/or trained to generate one or more refined predicted paths that replace duplicate candidate paths.

The one or more path refinement models 616 (e.g., one or more recurrent neural networks) can be configured and/or trained to receive output including information and/or data associated with the one or more path proposals generated by the one or more path proposal models 614. Further, the one or more path refinement models 616 can be configured to perform one or more operations including generating one or more confidence scores associated with the one or more path proposals. The one or more confidence scores can be associated with accuracy of each of the one or more path proposals (e.g., a path proposal that is more accurate and/or more likely to be correct can have a greater score than a path proposal that is less accurate and/or less likely to be correct). In some embodiments, the one or more path refinement models 616 can generate one or more refined predicted paths corresponding to the one or more objects. The one or more refined predicted paths generated by the one or more path refinement models 616 can be based at least in part on refinement of a bounding shape associated with each of the one or more objects at each time interval associated with each respective object. The one or more refined predicted paths can then be ranked based at least in part on their respective confidence scores, with the highest ranking predicted paths being included in the output data 618.

The autonomy output 334 can be indicative of the output data 618. The output data 618 can include information associated with the one or more predicted paths of the one or more objects. For example, the output data 618 can include one or more predicted locations (e.g., geographic locations including latitude, longitude, and/or altitude) of the one or more objects at one or more time intervals subsequent to the current time interval. The output data 618 can include information associated with one or more predicted trajectories of the one or more objects. In some embodiments, one or more portions of the output data 618 can be stored in the object path memory 620.

With reference again to FIGS. 2 and 3, the recipient system 304 (e.g., the second autonomous vehicle 204, its onboard vehicle computing system) can generate a motion plan for the recipient system 304 (e.g., the second autonomous vehicle 204) based at least in part on the autonomy output 334. For example, the recipient system 304 can include a motion planning system similar to that described herein with reference to FIG. 1. The motion planning system can determine a motion plan and generate motion plan data for the recipient system 304 (e.g., second autonomous vehicle 204) based at least in part on the autonomy output 334. The motion plan can be generated based at least in part on the autonomy output 334 in that it can consider an object 212 (and/or its future location(s) 216) described in the autonomy output 334 when planning the motion of the recipient system 304 (e.g., second autonomous vehicle 204), whether or not that is overridden by other factors (e.g., other objects, unexpected occurrences, etc.) or whether or not it eventually effects the actual motion of the recipient system 304 (e.g., second autonomous vehicle 204). The motion plan data can include vehicle actions, trajectories, waypoints, etc. with respect to the objects proximate to the recipient system 304 (e.g., second autonomous vehicle 204) as well as the predicted movements. For example, the motion planning system can include one or more machine-learned models/ optimization algorithms that consider cost data associated with an action of the recipient system 304 (e.g., second autonomous vehicle 204) as well as other objective functions (e.g., cost functions, etc.), if any, to determine optimized variables that make up the motion plan data. By way of example, the motion planning system can determine that the recipient system 304 (e.g., second autonomous vehicle 204) can perform a certain action (e.g., stop for the object 212) without increasing the potential risk to the recipient system 304 (e.g., second autonomous vehicle 204), violating any laws/rules, increasing risk to others, etc. The motion plan data can include a planned trajectory, velocity, acceleration, and/or other actions. For example, as illustrated in FIG. 2, the motion plan can include a trajectory 220 for the recipient system 304 (e.g., second autonomous vehicle 204) to avoid a collision with an object 212 (e.g., by stopping).

The recipient system 304 (e.g., second autonomous vehicle 204, its onboard vehicle computing system) can initiate a motion control of the recipient system 304 (e.g., second autonomous vehicle 204) based at least in part on the motion plan. A motion control can include an action to implement, change, continue, and/or otherwise effect the motion of the recipient system 304 (e.g., second autonomous vehicle 204). The motion planning system can provide the motion plan data indicative of actions, a planned trajectory, and/or other operating parameters to control systems to implement the motion plan data for the recipient system 304. For instance, the recipient system 304 can include an interface configured to translate the motion plan data into instructions. By way of example, the interface can translate motion plan data into instructions for controlling the recipient system 304 including adjusting the steering of "X" degrees and/or applying a certain magnitude of braking force to avoid interfering with an object 212 indicated in the autonomy output 322. The interface can send one or more control signals to the responsible control component (e.g., braking control system, steering control system, and/or acceleration control system) to execute the instructions and implement the motion plan data. In this way, the recipient system 304 (e.g., second autonomous vehicle 204) can account for and control its motion with respect to object(s) outside of the normal field of view of the recipient system 304 (e.g., second autonomous vehicle 204) but within the field of view of the transmitter system 302 (e.g., first autonomous vehicle 202).

In some implementations, the recipient system 304 can implement actions based at least in part on the autonomy output other than motion planning/control. By way of example, the second autonomous vehicle 202 can be assigned to the service request associated with a user. The service request can include a request to perform a vehicle service such as, for example, a transportation service. The second autonomous vehicle 202 can utilize the autonomy output to detect and locate the user. For example, the second autonomous vehicle 202 can determine the location of a user and predict the motion of the user to determine whether the user is nearby the second autonomous vehicle 202 and/or travelling toward the second autonomous vehicle 202. The second autonomous vehicle 202 can send or initiate the sending a notification (be another system) to the user based at least in part on the location of the user and/or a future location of the user. The notification can indicate, for example, that the second autonomous vehicle 202 has arrived, the location of the second autonomous vehicle 202, a route to the second autonomous vehicle 202, and/or other information. The second autonomous vehicle 202 can also, or alternatively, unlock a door of the second autonomous vehicle 202 based at least in part on the location of the user and/or the predicted future location(s) of the user. This can allow for improved user boarding of the vehicle.

Figure 7:
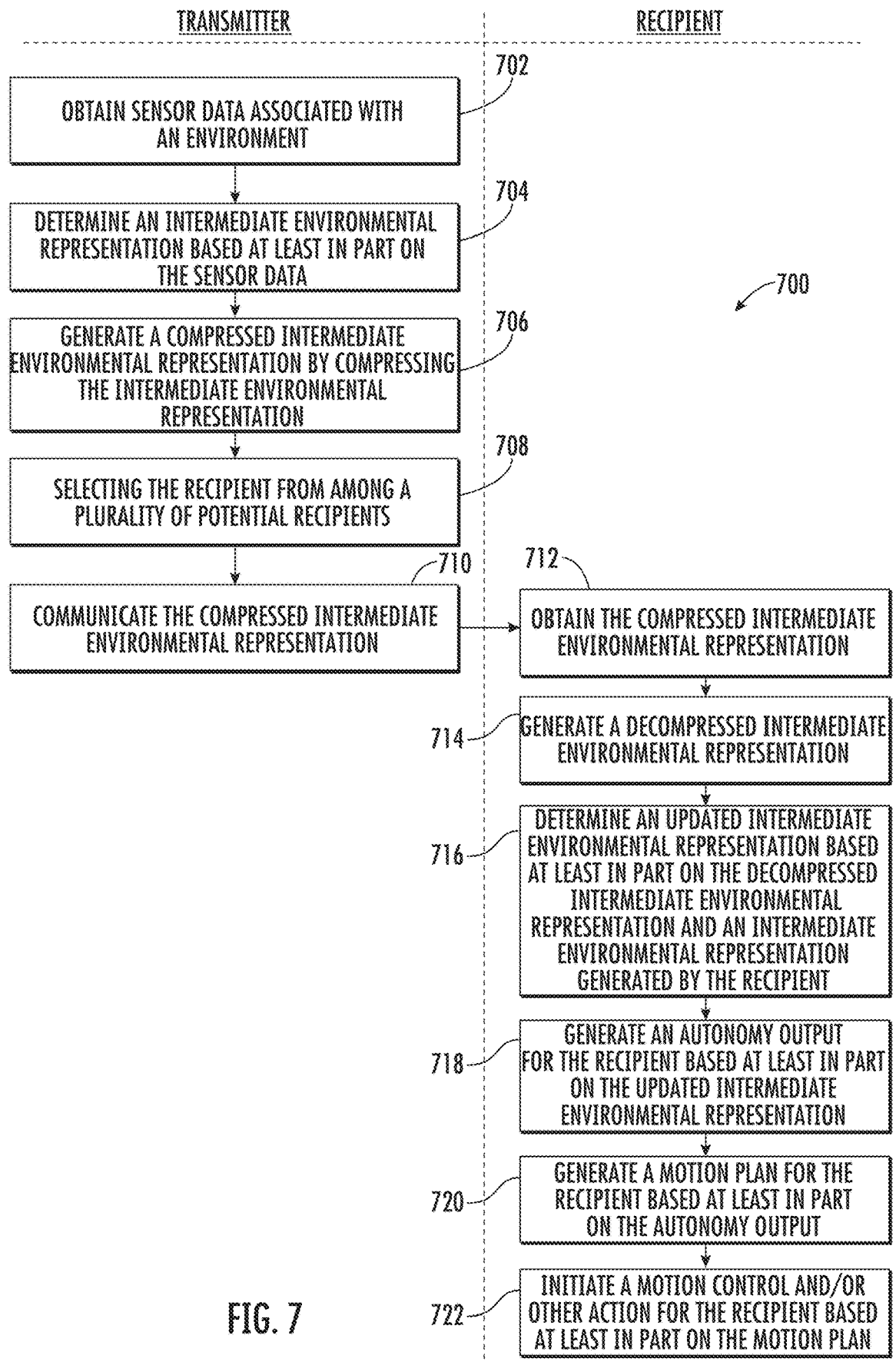
FIG. 7 depicts a flow diagram of a method according to example embodiments of the present disclosure.

FIG. 7 depicts a flow diagram of a method 700 according to example embodiments of the present disclosure. One or more portion(s) of the method 700 can be implemented by a computing system that includes one or more computing devices such as, for example, the computing systems described with reference to the other figures (e.g., a vehicle computing system, transmitter system, recipient system, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1, 9, 10, etc.), for example, to help operate an autonomous vehicle. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At (702), the transmitter computing system can obtain sensor data associated with an environment. For example, a computing system onboard a first autonomous vehicle (e.g., a transmitter system) can obtain sensor data associated with an environment of the first autonomous vehicle. The sensor data can be three-dimensional point cloud data. The sensor data can include LIDAR point cloud data. In some implementations, the sensor data can include a first type of sensor data (e.g., LIDAR data) and a second type of sensor data (e.g., RADAR data). The first type of sensor data can be associated with a first sensor modality (e.g., LIDAR system) and the second type of sensor data can be associated with a second sensor modality (e.g., RADAR system). In some implementations, the sensor data can include a first set of sensor data acquired by the first autonomous vehicle and a second set of sensor data acquired by another autonomous vehicle.

At (704), the transmitter computing system can determine an intermediate environmental representation based at least in part on the sensor data. For example, the computing system of the first autonomous vehicle (e.g., a transmitter system) can determine a first intermediate environmental representation of at least a portion of the environment of the first autonomous vehicle based at least in part on the sensor data. The first intermediate environmental representation can include a feature map describing at least the portion of the environment of the first autonomous vehicle.

The transmitter computing system can utilize one or more models for determining the intermediate environmental representation. For example, as described herein, the sensor data can include three-dimensional point cloud data. The computing system of the first autonomous vehicle can generate voxelized sensor data by voxelizing the three-dimensional point cloud data. The computing system can input the voxelized sensor data into a machine-learned model. The machine-learned model can be configured to apply one or more convolutional layers to the voxelized sensor data. The computing system can obtain the first intermediate environmental representation as an output of the machine-learned model.

At (706), the transmitter computing system can generate a compressed intermediate environmental representation by compressing the intermediate environmental representation. For example, the computing system of the first autonomous vehicle can generate a first compressed intermediate environmental representation by compressing the first intermediate environmental representation of at least the portion of the environment of the first autonomous vehicle, as described herein.

At (708), the transmitter computing system can select a recipient from among a plurality of potential recipients. For example, the computing system of the first autonomous vehicle can select a second autonomous vehicle to which to communicate the first compressed intermediate environmental representation from among a plurality of autonomous vehicles. In some implementations, this can include selecting the second autonomous vehicle based at least in part on data indicating that the second autonomous vehicle is capable of processing the compressed intermediate environmental representation. Processing the compressed intermediate environmental representation can include decompressing the intermediate environmental representation, as described herein. The autonomous vehicles can exchange such capability data when the autonomous vehicles are within communication range(s) of one another. In some implementations, this can include selecting the second autonomous vehicle based at least in part on a communication range of the first autonomous vehicle. As described herein, the communication range can be based on the vehicle's hardware (e.g., antenna hardware) and/or the communication protocol used.

In some implementations, the transmitter system 302 can communicate the first compressed intermediate environmental representation 312 in a broadcast manner, as described herein.

At (710), the transmitter computing system can communicate the compressed intermediate environmental representation to the recipient computing system. For example, the computing system of the first autonomous vehicle can communicate the first compressed intermediate environmental representation to a second autonomous vehicle.

At (712), the recipient computing system can obtain the compressed intermediate environmental representation. For example, a computing system of the second autonomous vehicle can obtain (from the first autonomous vehicle) a first compressed intermediate environmental representation. The first compressed intermediate environmental representation can be indicative of at least a portion of an environment of the second autonomous vehicle. This can be, for example, a portion within a field of view of one or more sensors of the first autonomous vehicle.

At (714), the recipient computing system can generate a decompressed intermediate environmental representation. For example, a computing system of the second autonomous vehicle can generate a first decompressed intermediate environmental representation by decompressing the first compressed intermediate environmental representation, as described herein.

At (716), the recipient computing system determine an updated intermediate environmental representation based at least in part on the decompressed intermediate environmental representation and an intermediate environmental representation generated by the recipient computing system. For example, the computing system of the second autonomous vehicle can determine, using one or more machine-learned models, an updated intermediate environmental representation based at least in part on the first decompressed intermediate environmental representation and a second intermediate environmental representation generated by the second autonomous vehicle. The second intermediate environmental representation can be one that is generated by the second autonomous vehicle in a manner similar to that described herein for the first intermediate environmental representation.

The one or more machine-learned models comprise a machine-learned aggregation model. As described herein, the machine-learned aggregation model can include a graph neural network. Each node of the graph neural network corresponds to a respective autonomous vehicle of a plurality of autonomous vehicles within the environment of the second autonomous vehicle. The plurality of autonomous vehicles can include the first autonomous vehicle. Each respective autonomous vehicle of the plurality of autonomous vehicles can be associated with a respective set of spatial coordinates. The machine-learned aggregation model can be configured to transform the first decompressed intermediate environmental representation based at least in part on a set of spatial coordinates associated with the first autonomous vehicle.

In some implementations, determining the updated intermediate environmental representation can include determining a first time-corrected intermediate environmental representation based at least in part on the first decompressed intermediate environmental representation and a time delay correction model. The first time-corrected intermediate environmental representation can account for a time delay associated with the first compressed intermediate environmental representation obtained from the first autonomous vehicle.

The computing system of the second autonomous vehicle can determine the updated intermediate environmental representation based at least in part on the first time-corrected intermediate environmental representation, the second intermediate environmental representation generated by the second autonomous vehicle, and the machine-learned aggregation model. For instance, the machine-learned aggregation model can be configured to aggregate the first time-corrected intermediate environmental representation and the second intermediate environmental representation and provide the updated intermediate environmental representation as an output of the machine-learned aggregation model. An example process for generating a time-corrected intermediate environmental representation is shown and described with reference to FIG. 8.

At (718), the recipient computing system can generate an autonomy output for the recipient computing system based at least in part on the updated intermediate environmental representation. For example, the computing system of the second autonomous vehicle can generate an autonomy output for the second autonomous vehicle based at least in part on the updated intermediate environmental representation. The computing system can input the updated intermediate environmental representation into a machine-learned perception and prediction model and obtain the autonomy output as an output of the machine-learned perception and prediction model, as described herein. The autonomy output can be indicative of a bounding shape associated with an object within the environment of the second autonomous vehicle and one or more predicted future locations of the object.

At (720), the recipient computing system can initiate a motion control for the recipient system based at least in part on the motion plan. For example, the computing system of the second autonomous vehicle can generate a motion plan for the second autonomous vehicle based at least in part on the autonomy output. For example, the object can be occluded from a field of view of one or more sensors of the second autonomous vehicle. The motion plan can include a trajectory to avoid a collision with the object (e.g., at a future time step).

At (722), the recipient computing system can initiate a motion control and/or other action(s) for the recipient computing system based at least in part on the motion plan. For example, the computing system of the second autonomous vehicle can initiate a motion control of the second autonomous vehicle based at least in part on the motion plan. The motion control can include the implementation of vehicle action(s) for the second autonomous vehicle to travel in accordance with a trajectory of the motion plan (e.g., to stop to avoid a collision with an object). In some implementations, the second autonomous vehicle can initiate a service action such as, for example, sending a notification to a user indicated in the autonomy output (e.g., via the vehicle's communication system, via an intermediary system, etc.) and/or unlocking a door of the second autonomous vehicle (e.g., by providing control signals to an associated door controller, etc.).

Figure 8:
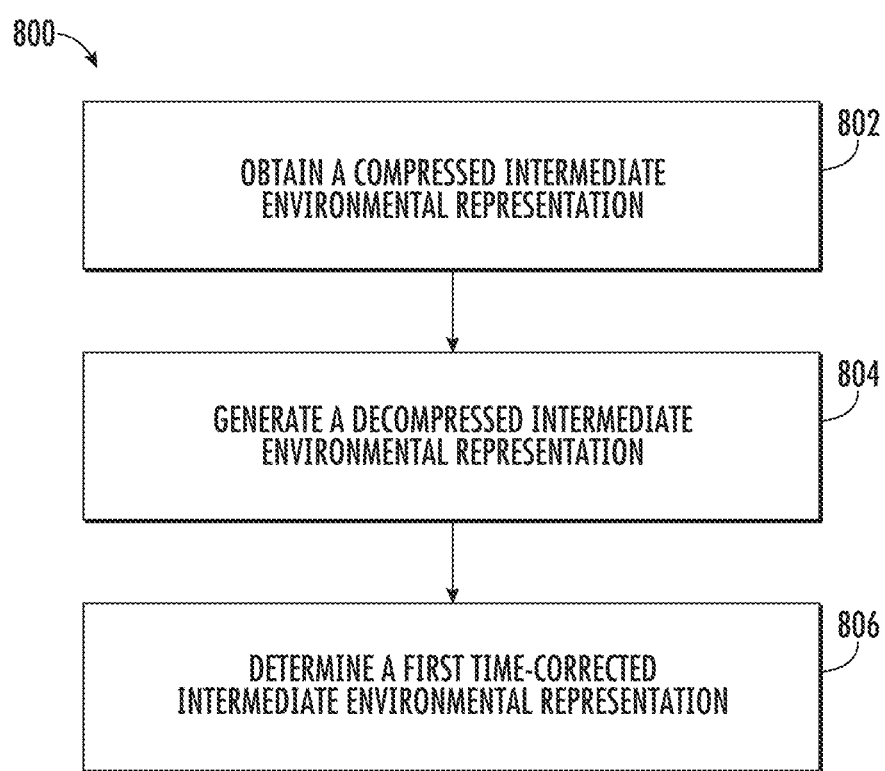
FIG. 8 depicts a flow diagram of a method according to example embodiments of the present disclosure.

FIG. 8 depicts a flow diagram of a method 800 according to example embodiments of the present disclosure for accounting for the time delay in the intermediate environmental representation(s). One or more portion(s) of the method 800 can be implemented by a computing system that includes one or more computing devices such as, for example, the computing systems described with reference to the other figures (e.g., a vehicle computing system, transmitter system, recipient system, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1, 9, 10, etc.), for example, to help generate time-corrected intermediate environmental representations. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At (802) and (804), the recipient computing system can obtain a compressed intermediate environmental representation and generate a decompressed first intermediate environmental representation, similar to the operations described in (712) and (714). For example, the computing system of the second autonomous vehicle can obtain (from the first autonomous vehicle) the first compressed intermediate environmental representation. The first compressed intermediate environmental representation can be indicative of at least a portion of an environment of the second autonomous vehicle and can be based at least in part on sensor data acquired by the first autonomous vehicle at a first time. The computing system of second autonomous vehicle can generate the first decompressed intermediate environmental representation by decompressing the first compressed intermediate environmental representation.

At (806), the recipient computing system can determine a first time-corrected intermediate environmental representation. For instance, the computing system of the second autonomous vehicle can determine a first time-corrected intermediate environmental representation based at least in part on the first decompressed intermediate environmental representation. The first time-corrected intermediate environmental representation can correspond to a second time associated with the second autonomous vehicle. By way of example, the recipient computing system can generate the first time-corrected intermediate environmental representation based at least in part on a machine-learned time correction model. The machine-learned time correction model can be configured to adjust the first decompressed intermediate environmental representation to account for a time difference between the first time and the second time. The first time can be associated with a sensor timestamp of the first autonomous vehicle. The second time can be indicative of a time at which the second autonomous vehicle intends to perceive the environment. The machine-learned time correction model can include a neural network. The computing system can input the decompressed intermediate environmental representation into the machine-learned time correction model. The computing system can obtain a time-corrected intermediate environmental representation as an output of the machine-learned time correction model. The computing system of the second autonomous vehicle can determine an updated intermediate environmental representation based at least in part on the first time-corrected intermediate environmental representation.

It should be noted that the division of functions and operations across the transmitter and recipient systems (e.g., first and second autonomous vehicles) is for example illustration purposes only. The transmitter and/or recipient systems (e.g., first and second autonomous vehicles) can perform any of the functions/operations of the methods 700 and 800 described herein.

Figure 9:
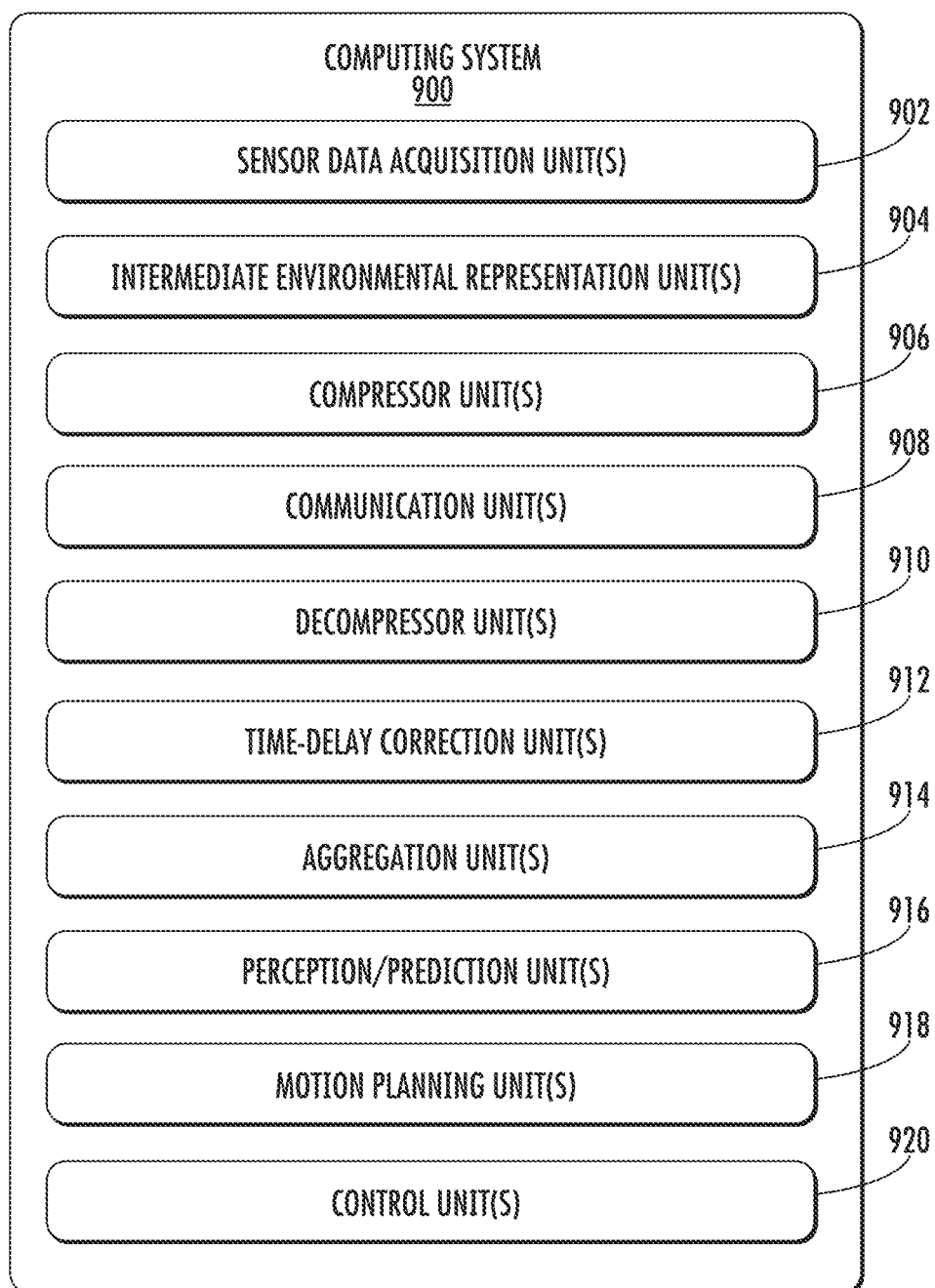
FIG. 9 depicts an example system with various means for performing operations and functions according example implementations of the present disclosure.

FIG. 9 depicts an example system 900 with various means for performing operations and functions according example implementations of the present disclosure. Various means can be configured to perform the methods and processes described herein. For example, a computing system can include sensor data acquisition unit(s) 902, intermediate environmental representation generation unit(s) 904, compressor unit(s) 906, communication unit(s) 908, decompressor unit(s) 910, time-delay correction unit(s) 912, aggregation unit(s) 914, perception/prediction unit(s) 916, motion planning unit(s) 918, control unit(s) 920, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., sensor data acquisition unit(s) 902, etc.) can be configured to obtain sensor data associated with an environment of an autonomous vehicle. The sensor data can include three-dimensional sensor data such as, for example, LIDAR point cloud data. The means (e.g., intermediate environmental representation unit(s) 904, etc.) can be configured to determine an intermediate environmental representation of at least a portion of the environment of the transmitter autonomous vehicle based at least in part on the sensor data. The intermediate environmental representation can include, for example, a feature map generated based at least in part on LIDAR point cloud data.

The means can be configured to compress, communicate, and decompress intermediate environmental representation(s). For example, the means (e.g., compressor unit(s) 906, etc.) can be configured to generate a compressed intermediate environmental representation by compressing the intermediate environmental representation of at least the portion of the environment of the transmitter autonomous vehicle, as described herein. The means (e.g., communication unit(s) 908, etc.) can be configured to communicate and/or obtain compressed intermediate environmental representation(s) and/or other information to/from another autonomous vehicle and/or another system. The means (e.g., decompressor unit(s) 910, etc.) can be configured to generate a decompressed intermediate environmental representation by decompressing the compressed intermediate environmental representation.

The means (e.g., time-delay correction unit(s) 912, etc.) can be configured to generating a time-corrected first intermediate environmental representation. This can include correcting for a time difference between a first time (e.g., when the sensor data used to generate intermediate environmental representation was acquired) and a second time (e.g., associated with the recipient autonomous vehicle, a second intermediate environmental representation thereof). To do so, the means can, for example, input the decompressed first intermediate environmental representation into a machine-learned time correction model and obtain a time-corrected intermediate environmental representation as an output of the machine-learned time correction model.

The means (e.g., aggregation unit(s) 914, etc.) can be configured to determine an updated intermediate environmental representation based at least in part on a decompressed intermediate environmental representation and another intermediate environmental representation (e.g., generated by a recipient autonomous vehicle). The updated intermediate environmental representation can be based on a plurality of other intermediate environmental representations from a plurality of other sources (e.g., autonomous vehicles, infrastructure elements, etc.).

The means (e.g., perception/prediction unit(s) 916, etc.) can be configured to generate an autonomy output for the recipient autonomous vehicle based at least in part on the updated intermediate environmental representation. The autonomy output can be indicative of the detection of an object within the environment and a predicted motion trajectory of the object (predicting future locations at future times).

The means (e.g., motion planning unit(s) 918, etc.) can be configured to generate a motion plan for the recipient autonomous vehicle based at least in part on the autonomy output. The motion plan can include a trajectory that was developed based on the detected object and/or future location(s) of the detected object. The means (e.g., control unit(s) 920, etc.) can be configured to initiate a motion control of the recipient autonomous vehicle based at least in part on the motion plan and/or another action (e.g., service action).

Figure 10:
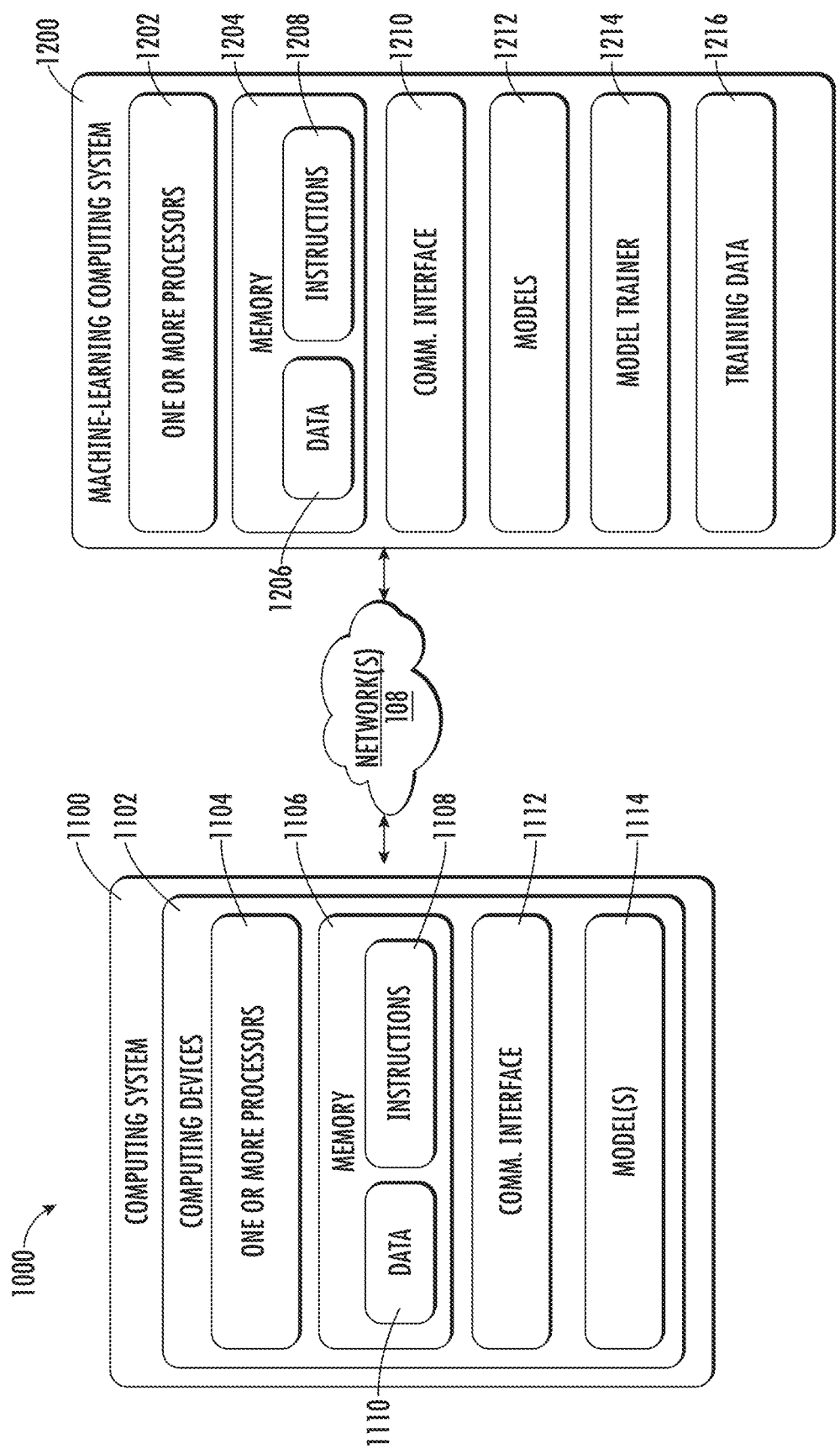
FIG. 10 depicts an example computing system according to example embodiments of the present disclosure.

FIG. 10 depicts an example computing system 1000 according to example embodiments of the present disclosure. The example system 1000 can include the computing system 1100 and a machine learning computing system 1200 that are communicatively coupled over one or more network(s) 1300. As described herein, the computing system 1100 can be implemented onboard a transmitter and/or recipient system such as that of a vehicle (e.g., as a portion of the vehicle computing system) and/or can be remote therefrom (e.g., as portion of an operations computing system). In either case, a vehicle computing system can utilize the operations and model(s) of the computing system 1100 (e.g., locally, via wireless network communication, etc.).

The computing system 1100 can include one or more computing device(s) 1102. The computing device(s) 1102 of the computing system 1100 can include processor(s) 1104 and a memory 1106. The one or more processors 1104 can be any suitable processing device (e.g., a processor core, a microprocessor, an ASIC, a FPGA, a controller, a microcontroller, etc.) and can be one processor or a plurality of processors that are operatively connected. The memory 1106 can include one or more non-transitory computer-readable storage media, such as RAM, ROM, EEPROM, EPROM, one or more memory devices, flash memory devices, etc., and combinations thereof.

The memory 1106 can store information that can be obtained by the one or more processors 1104. For instance, the memory 1106 (e.g., one or more non-transitory computer-readable storage mediums, memory devices) can include computer-readable instructions 1108 that can be executed by the one or more processors 1104. The instructions 1108 can be software written in any suitable programming language or can be implemented in hardware. Additionally, or alternatively, the instructions 1108 can be executed in logically and/or virtually separate threads on processor(s) 1104.

For example, the memory 1106 can store instructions 1108 that when executed by the one or more processors 1104 cause the one or more processors 1104 (the computing system 1100) to perform operations such as any of the operations and functions of a vehicle computing system, transmitter computing system, and/or recipient computing system and/or for which these computing systems are configured, as described herein, the operations for communicating with other systems, generating autonomy outputs/controlling motion (e.g., one or more portions of methods 700 and 800), and/or any other operations and functions, as described herein.

The memory 1106 can store data 1110 that can be obtained (e.g., received, accessed, written, manipulated, generated, created, stored, etc.). The data 1110 can include, for instance, sensor data, intermediate environmental representations, compressed intermediate environmental representations, decompressed intermediate environmental representations, time-corrected intermediate environmental representations, updated intermediate environmental representations, autonomy outputs, perception data, prediction data, motion planning data, control signals, models, times, and/or other data/information described herein. In some implementations, the computing device(s) 1102 can obtain data from one or more memories that are remote from the computing system 1100.

The computing device(s) 1102 can also include a communication interface 1112 used to communicate with one or more other system(s) (e.g., other systems onboard and/or remote from a vehicle, the other systems of FIG. 10, etc.). The communication interface 1112 can include any circuits, components, software, etc. for communicating via one or more networks 1300. In some implementations, the communication interface 1112 can include, for example, one or more of a communications controller, receiver, transceiver, transmitter, port, conductors, software and/or hardware for communicating data/information.

According to an aspect of the present disclosure, the computing system 1100 can store or include one or more machine-learned models 1114. As examples, the machine-learned models 1114 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, etc.), recurrent neural networks (e.g., long short-term memory recurrent neural networks, etc.), and/or other forms of neural networks. The machine-learned models 1114 can include the machine-learned models of FIGS. 3, 5, and 6 and/or other model(s), as described herein.

In some implementations, the computing system 1100 can receive the one or more machine-learned models 1114 from the machine learning computing system 1200 over the network(s) 108 and can store the one or more machine-learned models 1114 in the memory 1106 of the computing system 1100. The computing system 1100 can use or otherwise implement the one or more machine-learned models 1114 (e.g., by processor(s) 1104). In particular, the computing system 1100 can implement the machine learned model(s) 1114 to generate updated intermediate environmental representation(s), autonomy output(s), etc.

The machine learning computing system 1200 can include one or more processors 1202 and a memory 1204. The one or more processors 1202 can be any suitable processing device (e.g., a processor core, a microprocessor, an ASIC, a FPGA, a controller, a microcontroller, etc.) and can be one processor or a plurality of processors that are operatively connected. The memory 1204 can include one or more non-transitory computer-readable storage media, such as RAM, ROM, EEPROM, EPROM, one or more memory devices, flash memory devices, etc., and combinations thereof.

The memory 1204 can store information that can be accessed by the one or more processors 1202. For instance, the memory 1204 (e.g., one or more non-transitory computer-readable storage mediums, memory devices) can store data 1206 that can be obtained (e.g., generated, retrieved, received, accessed, written, manipulated, created, stored, etc.). In some implementations, the machine learning computing system 1200 can obtain data from one or more memories that are remote from the machine learning computing system 1200.

The memory 1204 can also store computer-readable instructions 1208 that can be executed by the one or more processors 1202. The instructions 1208 can be software written in any suitable programming language or can be implemented in hardware. Additionally, or alternatively, the instructions 1208 can be executed in logically and/or virtually separate threads on processor(s) 1202. The memory 1204 can store the instructions 1208 that when executed by the one or more processors 1202 cause the one or more processors 1202 to perform operations. The machine learning computing system 1200 can include a communication interface 1210, including devices and/or functions similar to that described with respect to the computing system 1100.

In some implementations, the machine learning computing system 1200 can include one or more server computing devices. If the machine learning computing system 1200 includes multiple server computing devices, such server computing devices can operate according to various computing architectures, including, for example, sequential computing architectures, parallel computing architectures, or some combination thereof.

In addition or alternatively to the model(s) 1114 at the computing system 1100, the machine learning computing system 1200 can include one or more machine-learned models 1212. As examples, the machine-learned models 1212 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 1212 can be similar to and/or the same as the machine-learned models 1114, and/or other model(s) described herein.

As an example, the machine learning computing system 1200 can communicate with the computing system 1100 according to a client-server relationship. For example, the machine learning computing system 1200 can implement the machine-learned models 1212 to provide a web service to the computing system 1100 (e.g., including on a vehicle, implemented as a system remote from the vehicle, etc.). For example, the web service can provide machine-learned models to an entity associated with a vehicle; such that the entity can implement the machine-learned model. Thus, machine-learned models 1212 can be located and used at the computing system 1100 (e.g., on the vehicle, at the operations computing system, etc.) and/or the machine-learned models 1212 can be located and used at the machine learning computing system 1200.

In some implementations, the machine learning computing system 1200 and/or the computing system 1100 can train the machine-learned models 1114 and/or 1212 through use of a model trainer 1214. The model trainer 1214 can train the machine-learned models 1114 and/or 1212 using one or more training or learning algorithms. One example training technique is backwards propagation of errors. In some implementations, the model trainer 1214 can perform supervised training techniques using a set of labeled training data. In other implementations, the model trainer 1214 can perform unsupervised training techniques using a set of unlabeled training data. The model trainer 1214 can perform a number of generalization techniques to improve the generalization capability of the models being trained. Generalization techniques include weight decays, dropouts, or other techniques.

The machine-learned model(s) 1114/1212 of the described system can be trained in several stages. For instance, a sensor backbone (e.g., LIDAR backbone for helping to create the intermediate environmental representation) and output headers can be pre-trained on a real-LiDAR single-vehicle dataset, bypassing the cross-vehicle aggregation stage. The loss function can be cross-entropy on a vehicle classification output and smooth l1 on the bounding box parameters. Hard-negative mining can be applied as well to improve performance. The sensor backbone (e.g., LIDAR backbone), cross-vehicle aggregation, and output header models can be jointly finetuned on a simulated vehicle-to-vehicle dataset (described below) with synchronized inputs (e.g., no time delay) using the same loss function. The training can avoid the use of a temporal warping function at this stage. During training, for every example in the minibatch, the number of connected vehicles can be randomly sampled uniformly on [0, min(c, 6)], where c is the number of candidate systems/vehicles available. This can help ensure that the architecture of the machine-learned model(s) 1114/1212 can handle arbitrary graph connectivity while also making sure the fraction of systems/vehicles in the scene/ecosystem on the network remains reasonable.

With the main network trained, the compression model (e.g., model 314) can be trained. To do so, the main network (backbone, aggregation, output header) can be fixed since this is reconstructing the decompressed feature map. The compression model can be trained with a rate-distortion objective, which aims to maximize the bit rate in transmission while minimizing the distortion between uncompressed and decompressed data. The rate objective can be defined as the entropy of the transmitted code, and the distortion objective as the reconstruction loss (e.g., between the decompressed and uncompressed feature maps). Finally, the temporal warping function can be trained to compensate for time delay with asynchronous inputs, where all other parts of the network are fixed. The time delay can be uniformly sampled between 0.0 s and 0.1 s (e.g., time of one 10 Hz LiDAR sweep).

In particular, the model trainer 1214 can train a machine-learned model 1114 and/or 1212 based on a set of training data 1216. The training data 1216 can include a simulated vehicle-to-vehicle dataset that can be created using a sensor simulation system. The sensor simulation system can be included in or separate from machine-learning computing system 1200. The sensor simulation system can use a large catalog of 3D static scenes and dynamic objects that are built upon real-world data collections to provide a set of rich and diverse assets from which to simulate new scenarios. The sensor simulation system can apply raycasting and machine learning to generate a realistic sensor point cloud such as, for example, a LIDAR point cloud. The sensor simulation system can allow for the creation of vehicle-to-vehicle scenes where a percentage of the vehicles are autonomous vehicles and generate realistic sensor data (e.g., LIDAR data) at different vehicle locations.

The simulations can be based on snippets (e.g., 25-second snippets, etc.) of labeled data recorded by a vehicle (e.g., autonomous vehicle) in the real world, which contains temporal tracks of the bounding boxes of all agents in the scene with respect to the recording vehicle. To generate the simulated vehicle-to-vehicle dataset, a real-world snippet can be recreated in a simulated virtual world using these ground-truth tracks. By using the same scenario layouts and agent trajectories recorded from the real world, the simulation system can replicate realistic traffic and vehicle motion for vehicle-to-vehicle dataset generation. At each timestep, actor 3D-assets can be placed into the virtual scene according to real-world labels and generate the sensor data (e.g., LIDAR point cloud data, etc.) at different candidate vehicle locations. Candidate autonomous vehicles can be non-parked vehicles that are within a communication range (e.g., a 50-meter broadcast range) of a subject vehicle in the scene (e.g., the autonomous vehicle that recorded the snippet in the real-world). This data generation approach allows for the generation of more realistic and diverse topologies of vehicle-to-vehicle communication networks.

In some implementations, the training data 1216 can be taken from the same vehicle as that which utilizes that model 1114/1212. In this way, the models 1114/1212 can be trained to determine outputs in a manner that is tailored to that particular system/vehicle. Additionally, or alternatively, the training data 1216 can be taken from one or more different vehicles than that which is utilizing that model 1114/1212. The model trainer 1214 can be implemented in hardware, firmware, and/or software controlling one or more processors.

The network(s) 108 can be any type of network or combination of networks that allows for communication between devices. In some embodiments, the network(s) 108 can include one or more of a local area network, wide area network, the Internet, secure network, cellular network, mesh network, peer-to-peer communication link and/or some combination thereof and can include any number of wired or wireless links. Communication over the network(s) 108 can be accomplished, for instance, via a network interface using any type of protocol, protection scheme, encoding, format, packaging, etc.

FIG. 8 illustrates one example system 1000 that can be used to implement the present disclosure. Other computing systems can be used as well. For example, in some implementations, the computing system 1100 can include the model trainer 1214 and the training dataset 1216. In such implementations, the machine-learned models 1114/1212 can be both trained and used locally at the computing system 1100 (e.g., at a vehicle).

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

It should be understood that each autonomous vehicle within the ecosystem (e.g., within a communication range) can perform the functions of a transmitter autonomous vehicle and the functions of a recipient autonomous vehicle as described above. As such, an autonomous vehicle can not only communicate compressed intermediate environmental representations to other autonomous vehicles but can also receive compressed intermediate environmental representations from other autonomous vehicles. In some implementations, the autonomous vehicle(s) can also, or alternatively, send and receive autonomy outputs (e.g., of the joint perception/prediction model) among one another.

What is claimed is:
1. A computer-implemented method for vehicle-to-vehicle communications, the method comprising:
 obtaining, by a first autonomous vehicle, sensor data associated with an environment of the first autonomous vehicle;
 determining an intermediate environmental representation of at least a portion of the environment of the first autonomous vehicle based at least in part on the sensor data;
 generating a compressed intermediate environmental representation by compressing the intermediate environmental representation of at least the portion of the environment of the first autonomous vehicle;
 selecting a second autonomous vehicle to which to communicate the compressed intermediate environmental representation from among a plurality of autonomous vehicles based at least in part on an ability of the second autonomous vehicle to decompress the compressed intermediate environmental representation, wherein selecting the second autonomous vehicle comprises:
  communicating with the second autonomous vehicle as the second autonomous vehicle enters a communication range of the first autonomous vehicle;
  exchanging, with the second autonomous vehicle, data indicating that the second autonomous vehicle is able to decompress the compressed intermediate environmental representation; and selecting the second autonomous vehicle based on the data indicating that the second autonomous vehicle is able to decompress the compressed intermediate environmental representation; and communicating the compressed intermediate environmental representation to the second autonomous vehicle.

2. The computer-implemented method of claim 1, wherein the sensor data comprises three-dimensional point cloud data, and wherein determining the intermediate environmental representation comprises:

generating voxelized sensor data by voxelizing the three-dimensional point cloud data;

inputting the voxelized sensor data into a machine-learned model, the machine-learned model configured to apply one or more convolutional layers to the voxelized sensor data; and obtaining the intermediate environmental representation as an output of the machine-learned model.

3. The computer-implemented method of claim 1, wherein the intermediate environmental representation comprises a feature map describing at least the portion of the environment of the first autonomous vehicle.

4. The computer-implemented method of claim 1, further comprising:

selecting the second autonomous vehicle to which to communicate the compressed intermediate environmental representation from among a plurality of autonomous vehicles.

5. The computer-implemented method of claim 4, wherein selecting the second autonomous vehicle to which to communicate the compressed intermediate environmental representation from among the plurality of autonomous vehicles comprises:

selecting, by the computing system, the second autonomous vehicle based at least in part on the communication range of the first autonomous vehicle.

6. The computer-implemented method of claim 1, wherein the sensor data comprises LIDAR point cloud data.

7. The computer-implemented method of claim 1, wherein the sensor data comprises a first type of sensor data and a second type of sensor data, wherein the first type of sensor data is associated with a first sensor modality, and the second type of sensor data is associated with a second sensor modality.

8. The computer-implemented method of claim 1, wherein the sensor data comprises a first set of sensor data acquired by the first autonomous vehicle and a second set of sensor data acquired by another autonomous vehicle.

9. A computing system comprising:

one or more processors; and one or more tangible, non-transitory, computer readable media that collectively store instructions that when executed by the one or more processors cause the computing system to perform operations, the operations comprising:

obtaining sensor data associated with an environment of a first autonomous vehicle;

determining an intermediate environmental representation of at least a portion of the environment of the first autonomous vehicle based at least in part on the sensor data and a machine-learned model;

generating a compressed intermediate environmental representation by compressing the intermediated environmental representation of at least the portion of the environment of the first autonomous vehicle;

selecting a second autonomous vehicle to which to communicate the compressed intermediate environmental representation from among a plurality of autonomous vehicles based at least in part on an ability of the second autonomous vehicle to decompress the compressed intermediate environmental representation, wherein selecting the second autonomous vehicle comprises:

communicating with the second autonomous vehicle as the second autonomous vehicle enters a communication range of the first autonomous vehicle;

exchanging, with the second autonomous vehicle, data indicating that the second autonomous vehicle is able to decompress the compressed intermediate environmental representation; and selecting the second autonomous vehicle based on the data indicating that the second autonomous vehicle is able to decompress the compressed intermediate environmental representation; and communicating the compressed intermediate environmental representation to the second autonomous vehicle.

10. The computing system of claim 9, wherein the sensor data comprises three-dimensional LIDAR point cloud data.

11. The computing system of claim 9, wherein determining the intermediate environmental representation comprises:

generating voxelized sensor data based at least in part on the sensor data; and generating the intermediate environmental representation based at least in part on the voxelized sensor data and the machine-learned model.

12. The computing system of claim 9, wherein the second autonomous vehicle is configured to decompress the compressed intermediate environmental representation and utilize the intermediate environmental representation for one or more autonomous operations of the second autonomous vehicle.

13. The computing system of claim 9, wherein the operations further comprise:

obtaining, from another autonomous vehicle, a second intermediate environmental representation of at least the portion of the environment of the first autonomous vehicle.

14. An autonomous vehicle comprising:

one or more sensors;

one or more processors; and one or more tangible, non-transitory, computer readable media that collectively store instructions that when executed by the one or more processors cause the one or more processors to perform operations, the operations comprising:

obtaining, via the one or more sensors, sensor data associated with an environment of the autonomous vehicle;

determining a first intermediate environmental representation of at least a portion of the environment of the autonomous vehicle based at least in part on the sensor data;

generating a first compressed intermediate environmental representation by compressing the first intermediate environmental representation of at least the portion of the environment of the autonomous vehicle;

determining a recipient to which to communicate the first compressed intermediate environmental representation from among a plurality of potential recipients based at least in part on an ability of the recipient to decompress the compressed intermediate environmental representation, wherein determining the recipient comprises:
- exchanging, with the recipient, data indicating that the recipient is able to decompress the compressed intermediate environmental representation; and
- selecting the recipient based on the data indicating that the recipient is able to decompress the compressed intermediate environmental representation;

communicating the first compressed intermediate environmental representation to the recipient.

15. The autonomous vehicle of claim 14, wherein determining the first intermediate environmental representation based at least in part on the sensor data comprises:
- generating voxelized sensor data by voxelizing three-dimensional point cloud data of the sensor data;
- inputting the voxelized sensor data into a machine-learned model; and
- receiving the first intermediate environmental representation as an output of the machine-learned model.

16. The autonomous vehicle of claim 15, wherein the machine-learned model is configured to apply one or more convolutional layers to the voxelized sensor data.

17. The autonomous vehicle of claim 14, wherein the operations further comprise:
- obtaining a second compressed intermediate environmental representation from another autonomous vehicle;
- generating a decompressed intermediate environmental representation by decompressing the second compressed intermediate environmental representation;
- determining, using one or more machine-learned models, an updated intermediate environmental representation based at least in part on the decompressed intermediate environmental representation and the first intermediate environmental representation generated by the first autonomous vehicle; and
- generating an autonomy output for the autonomous vehicle based at least in part on the updated intermediate environmental representation.

18. The autonomous vehicle of claim 17, wherein the operations further comprise compensating for a time delay between the first intermediate environmental representation and the decompressed intermediate environmental representation.

\* \* \* \* \*